US011970908B2

(12) United States Patent
Kanyanta et al.

(10) Patent No.: US 11,970,908 B2
(45) Date of Patent: Apr. 30, 2024

(54) SENSOR SYSTEM, CUTTER ELEMENT, CUTTING TOOL AND METHOD OF USING SAME

(71) Applicant: Element Six (UK) Limited, Oxfordshire (GB)

(72) Inventors: Valentine Kanyanta, Oxfordshire (GB); Santonu Ghosh, Oxfordshire (GB)

(73) Assignee: Element Six (UK) Limited, Didcot (GB)

( * ) Notice: Subject to any disclaimer, the term of this patent is extended or adjusted under 35 U.S.C. 154(b) by 206 days.

(21) Appl. No.: 17/613,824

(22) PCT Filed: May 27, 2020

(86) PCT No.: PCT/EP2020/064630
§ 371 (c)(1),
(2) Date: Nov. 23, 2021

(87) PCT Pub. No.: WO2020/239796
PCT Pub. Date: Dec. 3, 2020

(65) Prior Publication Data
US 2022/0243537 A1    Aug. 4, 2022

(30) Foreign Application Priority Data

May 28, 2019   (GB) .................................. 1907509

(51) Int. Cl.
*E21B 12/02*    (2006.01)
*B23B 27/20*    (2006.01)
(Continued)

(52) U.S. Cl.
CPC ............ *E21B 10/567* (2013.01); *B23B 27/20* (2013.01); *E21B 12/02* (2013.01); *H04B 1/3827* (2013.01);
(Continued)

(58) Field of Classification Search
CPC ........ E21B 10/567; E21B 12/02; H04W 4/38; H04B 1/3827; B23B 27/20; B23B 2223/125; B23B 2226/315
See application file for complete search history.

(56) References Cited

U.S. PATENT DOCUMENTS 10,807,913 B1 * 10/2020 Hawks .................. C04B 35/622
2011/0266058 A1 * 11/2011 Kumar .................... E21B 10/08
175/428

(Continued)

FOREIGN PATENT DOCUMENTS

CN    201837405 U    5/2011
CN    105612305 A    5/2016
(Continued)

OTHER PUBLICATIONS

Stoney, R. et al., "Dynamic wireless passive strain measurement in CNC turning using surface acoustic wave sensors," The International Journal of Advanced Manufacturing Technology, 69(5-8): 1421-1430 (Jun. 20, 2013).
(Continued)

*Primary Examiner* — Taras P Bemko
(74) *Attorney, Agent, or Firm* — Armstrong Teasdale LLP

(57) ABSTRACT

A sensor system has a cutter element for a cutting tool, an interrogation transceiver operable to transmit a radio-frequency (RF) interrogation signal; and a sensor transceiver system operable to receive the RF interrogation signal and to transmit an RF response signal. The sensor transceiver system includes a signal guide medium configured to transduce between the RF interrogation signal, a guided signal in the signal guide medium, and the RF response signal. A characteristic of the RF response signal is dependent upon a condition of the signal guide medium. The cutter element includes the signal guide medium to allow the condition of the signal guide medium to depend upon a condition of the
(Continued)

cutter element proximate the signal guide medium. A method of using the sensor system is also disclosed.

17 Claims, 17 Drawing Sheets

(51) Int. Cl.
*E21B 10/567* (2006.01)
*H04B 1/3827* (2015.01)
*H04W 4/38* (2018.01)

(52) U.S. Cl.
CPC ......... *H04W 4/38* (2018.02); *B23B 2226/125* (2013.01); *B23B 2226/315* (2013.01)

(56) References Cited

U.S. PATENT DOCUMENTS

| | | | |
|---|---|---|---|
| 2012/0325564 A1 | 12/2012 | Vaughn et al. | |
| 2013/0008717 A1* | 1/2013 | Deen | E21B 10/00 175/39 |
| 2013/0256032 A1 | 10/2013 | Palmer | |
| 2013/0270007 A1 | 10/2013 | Scott et al. | |
| 2014/0140781 A1 | 5/2014 | Sjoo et al. | |
| 2014/0224539 A1 | 8/2014 | Kumar et al. | |
| 2015/0284827 A1* | 10/2015 | Can | E21B 10/5735 51/309 |
| 2018/0258707 A1 | 9/2018 | DiFoggio | |
| 2020/0011170 A1* | 1/2020 | Cao | E21B 10/573 |
| 2022/0268146 A1* | 8/2022 | Zhan | E21B 47/26 |

FOREIGN PATENT DOCUMENTS

| | | |
|---|---|---|
| WO | 2015011489 A1 | 1/2015 |
| WO | 2015147786 A1 | 10/2015 |

OTHER PUBLICATIONS

International Search Report & Written Opinion issued for PCT/EP2020/064630, dated Sep. 8, 2020 (16 pages).

Combined Search and Examination Report issued for GB1907509.2, dated Nov. 15, 2019 (5 pages).

Combined Search and Examination Report issued for GB2007875.4, dated Oct. 28, 2020 (5 pages).

* cited by examiner

SENSOR SYSTEM, CUTTER ELEMENT, CUTTING TOOL AND METHOD OF USING SAME

CROSS REFERENCE TO RELATED APPLICATIONS

This application is a U.S. national stage entry under 35 U.S.C. § 371 of PCT/EP2020/064630 filed on May 27, 2020 which claims priority to GB 1907509.2 filed on May 28, 2019, both of which are incorporated by reference in their entirety for all purposes.

FIELD

This disclosure relates generally to sensor systems for determining an extent of degradation of a cutter element, particularly but not exclusively a diamond cutter element for oil and gas drilling; tools comprising the sensor systems and method of using the sensor systems.

BACKGROUND

Tools for processing bodies such as workpieces or rock formations by removing material from them generally comprise at least one cutter element attached to a tool body. For example, drill bits for boring into the earth to produce bore holes may comprise several cutter elements attached to a drill bit. The condition of the cutter elements tends to degrade with use, by wear mechanisms such as abrasion and fracture, and cutter elements need to be replaced when their degradation exceeds some limit. In some operations, particularly but not exclusively drilling wells in oil or gas exploration, it can be costly to cease the drilling operation to determine whether a cutter element is nearing the end of its working life or is no longer cutting effectively. In well boring operations, checking the cutter elements may require withdrawing the drill bit from a very deep borehole, potentially resulting in substantial lost production time.

Stoney, R, GE O'Donnell and D Geraghty ("Dynamic wireless passive strain measurement in CNC turning using surface acoustic wave sensor", *Int J Adv Manuf Techol*, Springer, 20 Jun. 2013) discloses using a surface acoustic wave (SAW) for monitoring a machine tool condition. A strain-sensitive wireless passive SAW sensor system is fixed to a tool holder, on which a cutter element is mounted. In use, an interrogation device sends a pulse of RF energy to the sensor and then switches off to receive an "echo-like" response signal, which may contain amplitude and phase information about the response of the SAW system.

There is a need for a system and method for determining whether a cutter element, particularly but not exclusively a super-hard cutter element on an earth boring drill bit, is nearing the end of its working life, or is no longer cutting effectively. The system may need to function in very abrasive environments.

SUMMARY

Viewed from a first aspect, there is provided a sensor system comprising: a cutter element for a cutting tool; an interrogation transceiver operable to transmit a radio-frequency (RF) interrogation signal; and a sensor transceiver system operable to receive the RF interrogation signal and to transmit an RF response signal; the sensor transceiver system including a signal guide medium configured to transduce between the RF interrogation signal, a guided signal in the signal guide medium, and the RF response signal; a characteristic of the RF response signal being dependent upon a condition of the signal guide medium; wherein the cutter element includes the signal guide medium, the condition of the signal guide medium depending upon a condition of the cutter element proximate the signal guide medium.

Viewed from a second aspect, there is provided a cutter element for an example disclosed sensor, including the signal guide medium.

Viewed from a third aspect, there is provided a drill bit assembly for boring into the earth, comprising a drill bit and an example disclosed sensor system, wherein the cutter element and the interrogation transceiver are attached to the drill bit.

Viewed from a fourth aspect, there is provided a method of using an example disclosed sensor system, the cutter element and interrogation transceiver attached to a drill bit for boring into the earth; the cutter element comprising a super-hard portion; the method including: using the drill bit to bore into the earth; the interrogation transceiver transmitting an RF interrogation signal; the sensor transceiver system transducing between the RF interrogation signal, and a respective guided signal in the signal guide medium, and a respective RF response signal; the interrogation transceiver receiving the RF response signal; a signal processor device processing the RF response signal and generating an indication of the condition of the cutter element.

Various example methods and systems are envisaged by this disclosure, of which various non-limiting, non-exhaustive examples and variations are described as follows.

In some example arrangements, the cutter element may comprise a super-hard portion comprising super-hard material, defining a cutting edge. In some examples, the super-hard portion may be attached to a substrate portion. The signal guide medium, or at least a portion of the signal guide medium, may be mounted onto the super-hard material portion; for example, the signal guide medium may be attached to the super-hard material by a layer of adhesive material, or by an attachment portion comprising metallic bonding material, disposed between the signal guide medium and the super-hard material. The super-hard material may have a super-hard surface, and the signal guide medium, or a portion thereof, may be attached to the super-hard surface.

In some examples, the super-hard material may comprise or consist essentially of a plurality of super-hard grains, such as diamond grains or cBN grains, and non-super-hard material within interstitial regions between the super-hard grains. The non-super-hard material may comprise metal such as Co, Fe, Ni or Mn, in elemental or alloy form, and/or ceramic material. For example, the super-hard portion may comprise material selected from the group including polycrystalline diamond (PCD), single-crystalline diamond, polycrystalline diamond produced by chemical vapour deposition (CVD), and polycrystalline cubic boron nitride, PCBN, material. Polycrystalline diamond may comprise or consist essentially of diamond grains, or include non-diamond material, or include voids.

In some example arrangements, the sensor transceiver system may comprise a transceiver antenna and a transducer, the transceiver antenna connected to the transducer, and the transducer connected to the signal guide medium. In other example arrangements, the signal guide medium may be operable to transduce between the RF interrogation signal, the guided signal and the RF response signal; in other words, the signal guide medium itself may function as a transceiver antenna and a transducer.

In some example arrangements, the signal guide medium may form an antenna, operable to backscatter the RF interrogation signal as the RF response signal. In some examples, the respective antenna of the interrogation transceiver and/or the sensor transceiver system may comprise coiled wire seated within a respective ceramic housing, the ceramic material having suitable dielectric properties and wear resistance.

In some example arrangements, the sensor transceiver system may include a transducer, and the signal guide medium may include an acoustic channel; the transducer communicatively connected to the acoustic channel.

In some example arrangements, the sensor system may comprise a signal processor system communicatively connected to the interrogation transceiver, to receive an indicative signal, indicative of the RF response signal, and configured to process the indicative signal and generate an output, indicative of the condition of the cutter element.

In some example arrangements, the sensor transceiver systems may include a magnetic field sensor device and/or a temperature sensor device.

In some example arrangements, the sensor system may comprise a plurality of cutter elements and a plurality of respective sensor transceiver systems, each cutter element including a respective signal guide medium; wherein each sensor transceiver system is configured to receive the RF interrogation signal and to transmit a respective RF response signal.

In some example arrangements, the super-hard portion may include a wear region coterminous with the cutting edge. The wear region may be removed in use, for example by physical (such as abrasive) and/or chemical wear, and/or by fracture, including microfracture. Removal of super-hard material within the wear region in use may proceed at uniform rate for at least some of the time, and/or by fracture of relatively large pieces for at least some of the time. A surface of the super-hard portion, and in some examples the substrate portion, may become exposed as material within the wear region is removed in use; the exposed surface may be referred to as a "wear surface", and may increase in area as material is removed from the wear region. An end-of-life condition of the cutter element may be characterised by a maximum area of the wear surface, and/or by a volume of the wear region, and/or by a maximum diametrical distance from the cutting edge. For example, an end-of-life condition of an example cutter element may be characterised by a diametrical distance from the cutting edge, the diametrical distance extending over a rake surface of the super-hard portion, perpendicular to a tangent to the cutting edge.

In some example arrangements, the cutter element may have a central longitudinal axis, the super-hard portion having at least one diameter extending from the cutting edge to an opposite edge, through the central longitudinal axis. In some example configurations, the super-hard portion may have a circular edge and the diameter may have a single value at all circumferential points; in some example configurations, the super-hard portion may have a non-circular (for example, an elliptical) edge and the diameter may have a plurality of values depending on the circumferential (that is, azimuthal) position.

In some example arrangements, at least a portion of the signal guide medium (which may be referred to as a "vulnerable portion" of the signal guide medium) may extend into the wear region, to allow the signal guide medium to be modified or damaged when at least a part of the vulnerable portion is lost as the wear surface intersects with the vulnerable portion. In some example arrangements, the signal guide medium may include a portion (that is, a vulnerable portion) that lies within a distance $3/8^{th}$ of the diameter from the cutting edge; an example signal guide medium may extend up to $5/8^{th}$ of the diameter. The wear region may extend an edge distance $3/8^{th}$ of the diameter from the cutting edge.

In some example arrangements, the signal guide medium may comprise a micro-electromechanical sensor (MEMS), which may be operable to modify the guided signal.

In some example arrangements, the sensor transceiver system may comprise a surface acoustic wave, SAW, mechanism, including an RF antenna and a transducer; and the signal guide medium may comprise a piezoelectric layer and at least one reflector element attached to the piezoelectric layer, operable to reflect a first acoustic signal, guided by the piezoelectric layer, as a second acoustic signal, guided by the piezoelectric layer; the RF antenna connected to the transducer, and the transducer connected to the piezoelectric layer, operable to transduce the RF interrogation signal to the first acoustic signal and to transduce the second acoustic signal to the RF response signal.

In some example arrangements, the characteristic (for example, an electrical or acoustic characteristic or property) of the signal guide medium may be dependent upon the temperature or strain of the cutter element proximate the signal guide medium.

In some example arrangements, the cutter element may include the entire sensor transceiver system.

In some example arrangements, the sensor system may include a signal booster device, communicatively connected to the interrogation transceiver and configured to generate a booster signal, indicative of a characteristic of the RF response signal; wherein the signal booster device may be attached to an example drill bit.

In some example arrangements, the sensor system may include a signal processor device, communicatively connected to the interrogation transceiver; wherein the signal processor device may be attached to the drill bit.

In some example arrangements, the sensor system may comprise a plurality of cutter elements and a plurality of respective sensor transceivers, each cutter element including a respective signal guide medium; wherein each cutter element and the interrogation transceiver may be attached to the drill bit.

In some examples, the sensor transceiver system may include a power source, or a circuit for harvesting the power of the RF interrogation signal, to power the transmission of the RF response signal. The sensor transceiver device may be provided as a package of all the electronic components of the sensor transceiver system, mounted onto the transducer base plate. Each first transceiver devices, and the signal booster, may comprise a respective battery to provide electrical power for up to about 100 hours.

Any apparatus feature as described herein may also be provided as a method feature, and vice versa.

Non-limiting example methods and systems will be described with reference to the appended drawings, of which:

FIG. 1A shows a schematic drawing of an example sensor system comprising an example cutter insert for an earth-boring bit prior to use, showing a side view (left side) and a top view (centre) of the example cutter insert including an example RF backscatter antenna, as well as a schematic representation of an RF interrogation transceiver (right side); and FIG. 1B shows the example sensor system of FIG. 1A together with schematic representations of a signal processor system in communication with the RF interrogation transceiver, a signal booster and a data processor system;

Figure 10A:
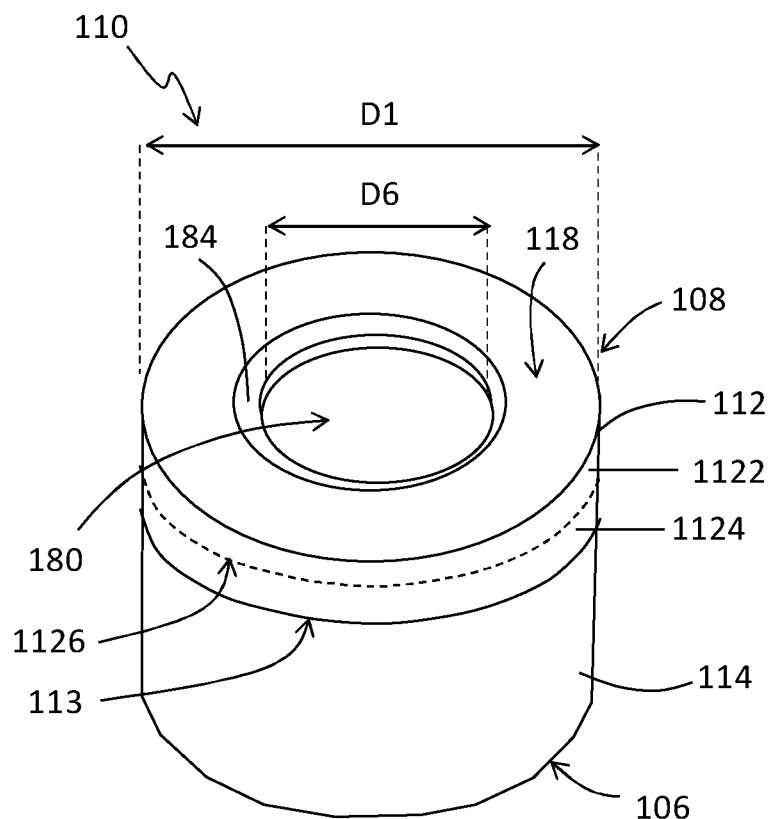
FIG. 10A shows a schematic perspective view of an example cutter element including a cavity for housing a sensor transceiver system; the example cutter insert comprises a layer of PCD material joined to a substrate portion.
Figure 10B:
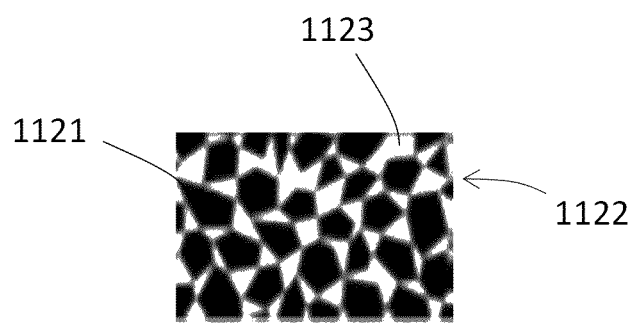
Figure 10C:
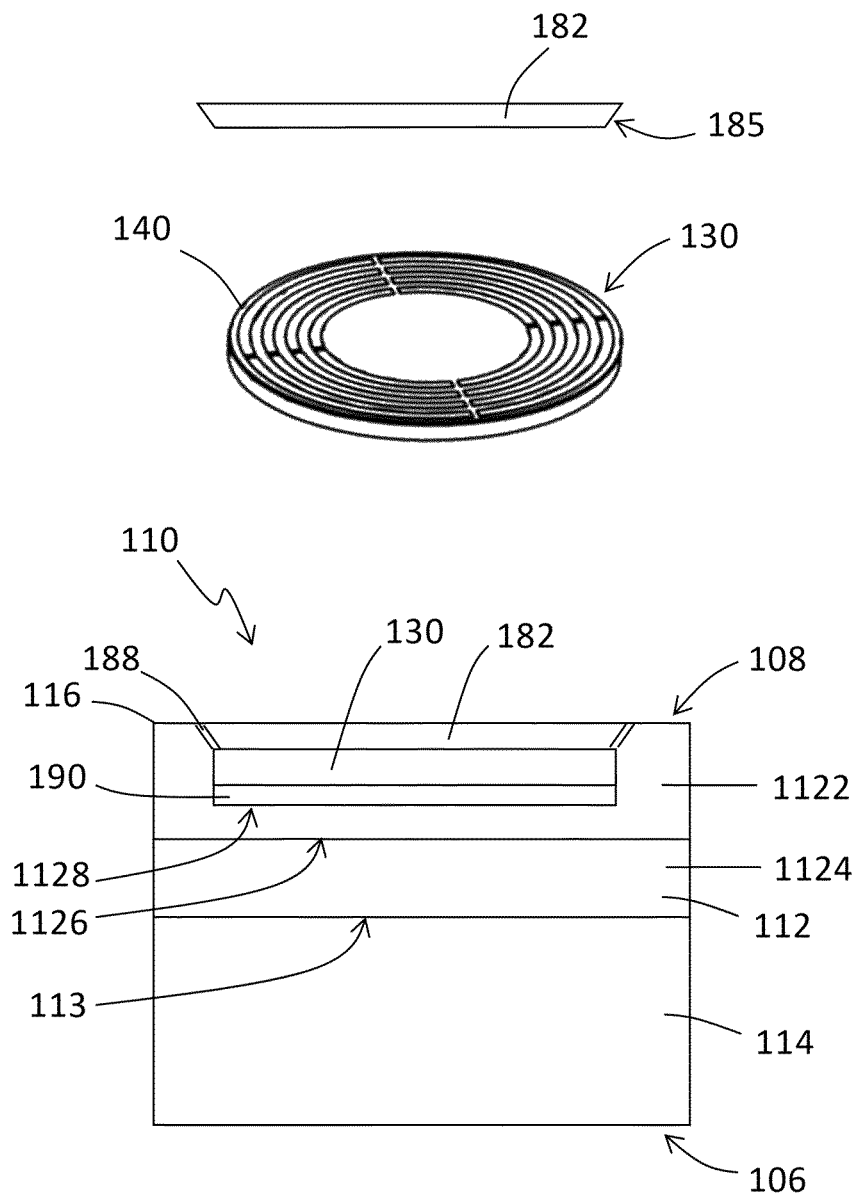

FIG. 10B shows a schematic magnified section of PCD material in the PCD portion, showing a schematic example arrangement of diamond grains and interstitial regions among them; and FIG. 10C shows a schematic side view of a cover (top) for a cavity, a perspective view of an example RF backscatter antenna (centre), and a schematic longitudinal cross-section view of an example cutter insert, including the RF backscatter antenna housed in the cavity, closed by the attached cover.

As used herein, "super-hard" material refers to single- or polycrystalline material having a 1 kg Vickers hardness (HV) of at least 20 GPa. Super-hard material may include single-crystal diamond and cubic boron nitride (cBN) material, as well as certain polycrystalline materials comprising a plurality of diamond or cBN grains. Some super-hard materials may have a 1 kg Vickers hardness of at least 25 GPa, or at least 30 GPa. As used herein, Vickers hardness is according to the ASTM384-08a standard.

A super-hard polycrystalline material may comprise an aggregation of a plurality of super-hard grains such as diamond or cBN grains, a substantial portion of which may, or may not, be directly inter-bonded and may include interstitial regions among the super-hard grains. The interstitial regions may contain non-super-hard filler material such as metal in elemental or alloy form, ceramic material or intermetallic material, for example. The filler material may bind the super-hard grains together, and/or at least partially fill the interstitial regions. The content of the super-hard grains in super-hard polycrystalline material may be at least about 50 volume %, or at least about 70 volume %, or at least about 80 volume %; and/or at most about 97 volume %, or at most about 95 volume %, or at most about 90 volume % of the polycrystalline material.

As used herein, polycrystalline diamond (PCD) material comprises a plurality of diamond grains, a substantial portion of which are directly inter-bonded with each other, or which contact each other at grain boundaries. Polycrystalline diamond may comprise or consist essentially of diamond grains, or include non-diamond material or voids. In some polycrystalline diamond material, the diamond grains may account for at least 80% of the volume of PCD material, substantially all the remaining volume being a network of interstitial regions among the diamond grains. The interstitial regions may be partly or entirely filled with diamond sintering aid material, or other filler material, or at least some of the interstitial regions may contain voids. Sintering aid for diamond may also be referred to as "catalyst material" for promoting the growth of diamond grains or the formation of diamond necks between adjacent diamond grains, under thermodynamically stable conditions for diamond. Catalyst material for diamond may also function as an effective solvent material for carbon, and diamond sintering aid material may also be referred to as "solvent/catalyst" material. Examples of solvent/catalyst materials for diamond include iron (Fe), nickel (Ni), cobalt (Co) and manganese (Mn), and certain alloys including at least one of these elements. PCD material may be produced by subjecting an aggregation of diamond grains to an ultra-high pressure (for example, at least about 6 GPa) and a high temperature (for example, at least about 1,200° C.) in the presence of molten solvent/catalyst material. During the HPHT process, solvent/catalyst material may infiltrate through the interstitial regions among the diamond grains from an adjacent source, such as a Co-cemented tungsten carbide substrate. Consequently, PCD material may comprise or consist essentially of the inter-bonded diamond grains and interstitial regions containing Co. Some polycrystalline diamond material consisting essentially of diamond may be manufactured by a chemical vapour deposition (CVD) process, at a low pressure.

Figure 1A:
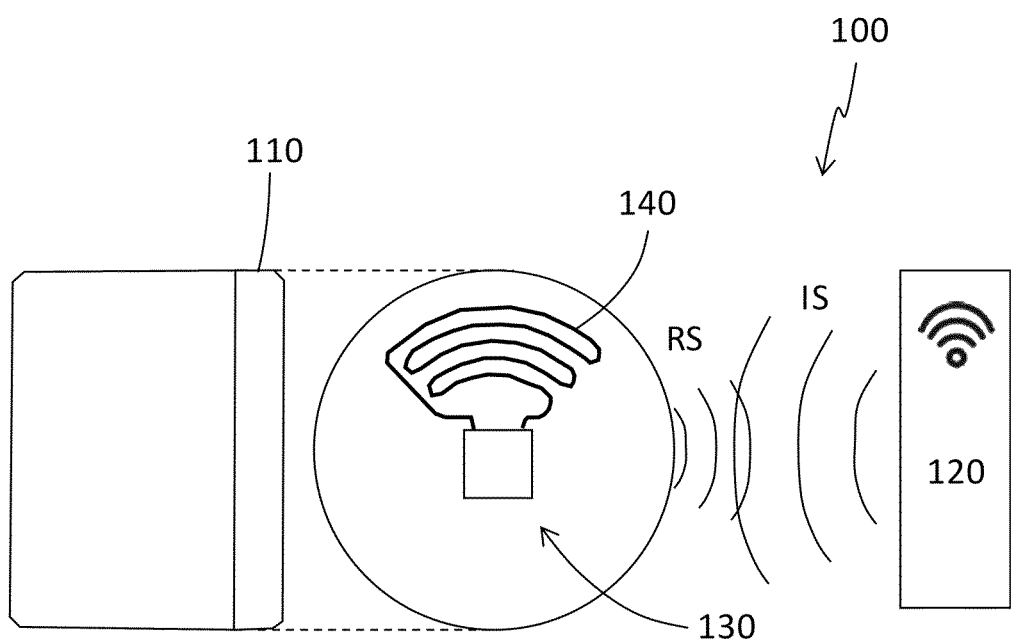
Figure 1B:
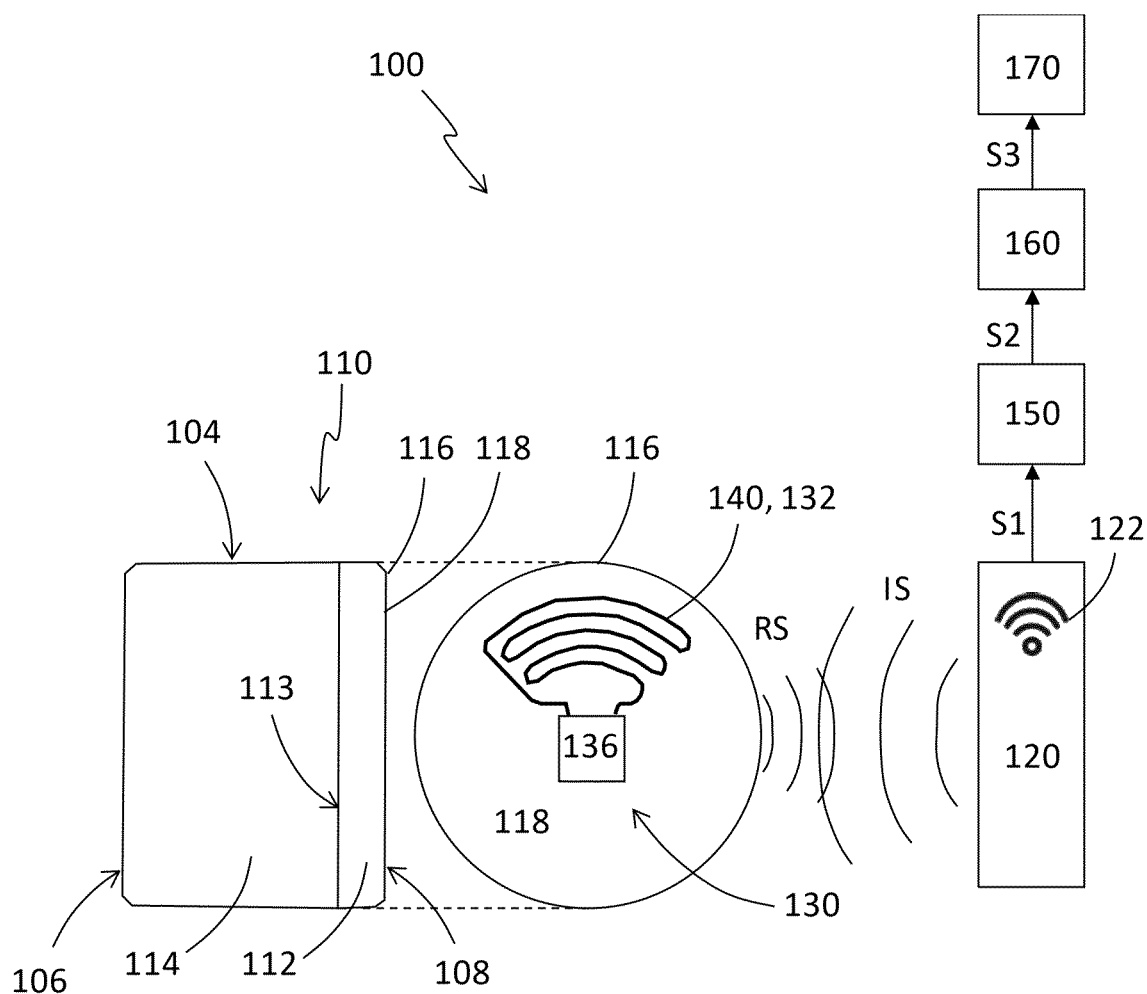
Figure 2A:
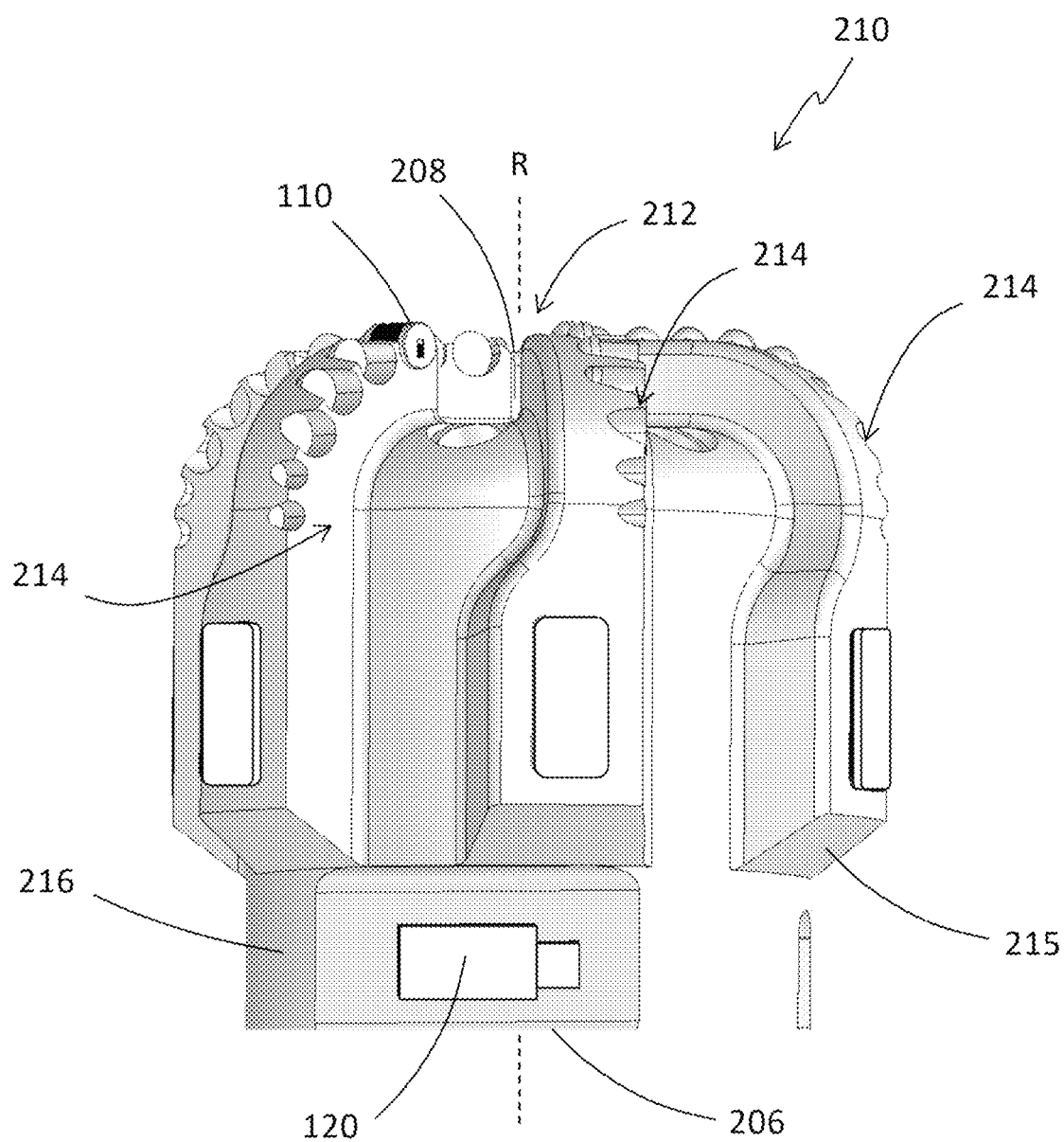
FIG. 2A shows a schematic side view of an example drill bit, including an example cutter insert and an example interrogation transceiver, both attached to the drill bit.

With reference to FIGS. 1A to 4, an example sensor system 100 comprises a cutter insert 110 for an earth-boring drill bit (as illustrated in FIG. 2A), an interrogation transceiver 120, a sensor transceiver system 130, a signal processor system 150, a signal booster 160 and a data processor system 170. As used herein, a cutter insert may be a type of cutter element that can be attached to a tool body such as a drill bit by inserting the cutter insert into a recess provided in the tool body; for example, a cutter insert may be braze-joined to a tool body, the cutter insert inserted within a recess in the tool body.

The sensor transceiver system 130 may comprise a sensor antenna 132 attached to the cutter insert 110, for receiving and transmitting RF electromagnetic signals. As used herein, the term "radio frequency" (RF) covers about 100 kHz to about 10 GHz of the electromagnetic spectrum, and may lie within the industrial, scientific and medical (ISM) radio band. In the illustrated example, the sensor antenna 132 may comprise a signal guide medium 140 formed as a track of electrically conducting material, to carry (or guide) a transient electrical signal generated within the track 140 in response to an incident RF electromagnetic signal, referred to as an "RF interrogation signal" IS, transmitted by the interrogation transceiver 120. As used herein, the word "guide" in the phrase "signal guide medium" indicates that the path or spatial extent of the electrical or acoustic signal, for example, is constrained by the signal guide medium, in contrast to a broadcast RF electromagnetic signal. The interrogation transceiver 120 may be communicatively connected to the signal processor system 150, which may be communicatively connected to the data processor system 170 by means of the signal booster 160.

The interrogation transceiver 120 comprises an interrogation antenna 122, configured to generate an RF interrogation signal IS. Example RF interrogation signals IS may be in the radio band and have a frequency of about 120 kHz to about 950 MHz, or about 2.4 GHz to about 5.8 GHz. In this particular example, the track 140 forming the sensor antenna 132 is cooperatively configured with the interrogation antenna 122, to resonantly couple with the RF interrogation signal IS. Because of the resonant coupling, the sensor antenna 132 can backscatter the RF interrogation signal IS, retransmitting it as an RF response signal RS. The track 140 may be connected to an electronic circuit 136, configured to harvest power from the RF interrogation signal IS, to power the transmission of the RF response signal RS. The interrogation transceiver 120 receives the backscattered RF response signal RS and may transmit an indicative response signal S1 to the signal processor system 150, the indicative signal S1 being indicative of one or more feature of the RF response signal RS.

The RF response signal RS transmitted by a sensor transceiver system 130 may generally depend on the temperature of the local environment and exhibit a temperature-dependent phase change (or phase shift). For example, the impedance of the signal guide medium 140 may depend on temperature, resulting in a shift of its resonant frequency and/or a shift in the phase of the RF response signal RS. The phase change may be calibrated against temperature and used to indicate the temperature of the signal guide medium 140 and consequently the cutter insert 110. A shift in the RF response signal RS resonance frequency may be detected as a substantial attenuation of the RF response signal RS received at the interrogation transceiver 120, which may be configured to resonate at the originally transmitted RF interrogation signal IS. Information about the temperature of the cutter insert 110 may be used to optimise the drilling (or other) process.

In some examples, the interrogation transceiver 120 may transmit RF interrogation signals IS over a range of RF frequencies and/or a range of phase rotations, scanning over the range or ranges to "ping" the sensor transceiver system at various frequencies and/or phases. The interrogation transceiver 120 may pause the transmission of RF interrogation signals between successive pings to detect an RF response signal RS in response to each ping. In some examples, the signal processor system 150 may control the interrogation transceiver 120 to scan over a range of RF interrogation signal IS frequencies to determine the actual resonance frequency of the sensor transceiver system 130 in use. For example, the actual resonant frequency of the sensor transceiver system 120 may shift because of a change in its impedance, indicative of the temperature or strain, for example. If the signal guide medium 140 of the sensor transceiver system 120 has been severely damaged, then an RF response signal RS may not be detected by the interrogation transceiver 120 during the interval between pings.

The signal processor 150 may process the RF response signal RS to determine changes in its intensity and/or its phase, and/or the resonant frequency of the sensor transceiver system 130, or an electronic characteristic of the signal guide medium 140. For example, the phase, amplitude and/or the resonant frequency of the RF response signal RS may change dependent on the temperature of the signal guide medium 140. In addition, these characteristics may change dependent on changes in the environmental magnetic field, which may arise due to a change in the orientation of the cutter element relative to the earth's magnetic field, or the magnetic properties of the rock being drilled.

In the illustrated example, the signal processor system 150 transmits a processed signal S2 to the signal booster 160, which transmits a boosted signal S3 to the data analysis system 170, which may be remote from the signal processor system 150 and the cutter insert 110. In some example arrangements, the indicative signal S1 may simply be an amplified version of the RF response signal RS; and/or the processed signal S2 may be substantially identical to the RF response signal RS, and/or to the indicative signal S1. In some example arrangements, the indicative signal S1 may be received by the data analysis system 170, amplified by the signal booster 160; in other words, some example sensor systems 100 may not include a signal processor system 150 that is distinct from the data analysis system 170. In some example arrangements, the indicative signal S1 (and, optionally, the processed signal S2, and/or the boosted signal S3) may encode a binary state, indicating whether the cutter insert 110 is in a failure condition. In other examples, the indicative signal S1 (and, optionally, the processed signal S2, and/or the boosted signal S3) may encode additional, non-binary, information about a condition of the cutter insert 110, such as its temperature or strain. An operator may use the data analysis system 170 to determine a condition of the cutter element 110 in use.

In this particular example, the cutter insert 110 has a proximal end 106 and a distal end 108, the proximal and distal ends 106, 108 connected by a substantially cylindrical side surface 104. The cutter insert 110 may comprise a super-hard portion 112 joined to a substrate portion 114 of cobalt-cemented tungsten carbide (Co-WC) material. The super-hard portion 112 may comprise or consist essentially of polycrystalline diamond (PCD) material 112, forming a PCD portion 112. The substrate 114 may be coterminous with the proximal end 106 and the PCD material 112 may define a PCD surface 118 at the distal end 108. The PCD surface 118 includes cutting edge 116 defined by the PCD material 112, for cutting a rock formation or a workpiece (not shown) and may include a peripheral chamfer surface 115 adjacent the cutting edge 116. The PCD portion 112 may be joined to the substrate 114 at a substantially planar or a non-planar interface boundary 113 opposite the PCD surface 118. The PCD portion 112 may be in the form of a PCD layer 112 having a mean thickness of about 2 mm to about 3 mm. In various examples, the cutter insert 110 may have a diameter D1 of 13 mm, 16 mm, 19 mm or 25 mm.

In some example sensor systems 100, the cutter insert 110 may include a super-hard portion 112 that comprises or consists essentially of polycrystalline cubic boron nitride (PCBN) material, or various other composite materials including diamond grains or polycrystalline cubic boron nitride (cBN) grains. For example, the super-hard portion 112 may comprise a sheet of diamond manufactured by chemical vapour deposition (CVD), or a composite material comprising diamond grains bonded together by ceramic material, such as silicon carbide.

Figure 2B:
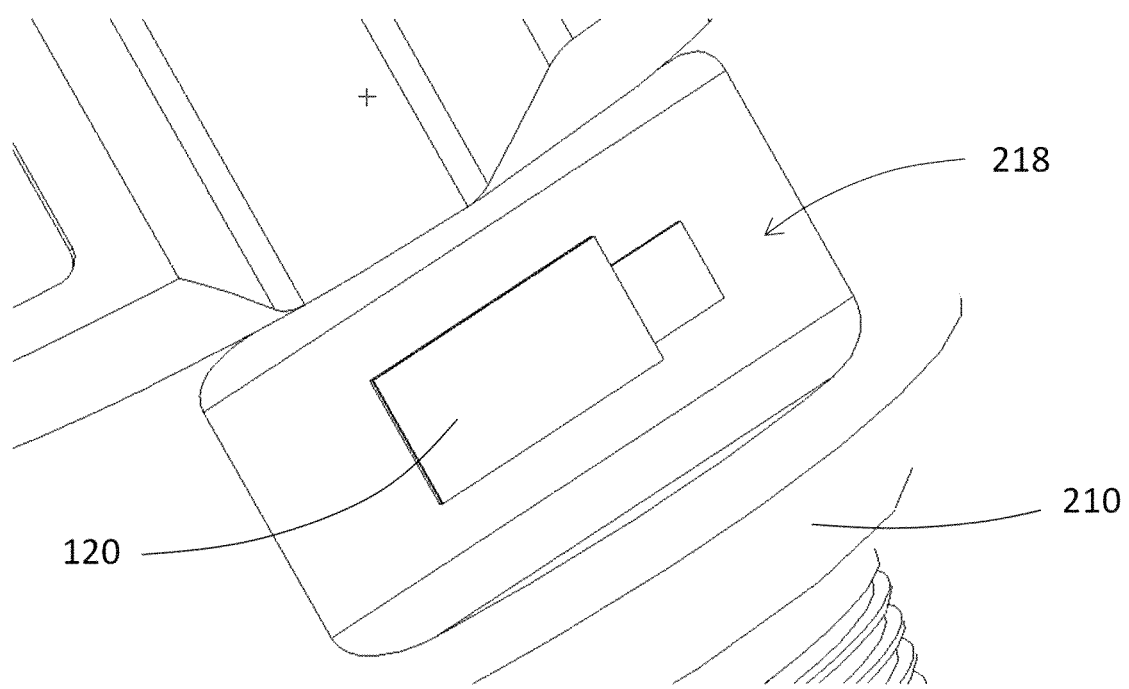
FIG. 2B shows a schematic enlarged perspective view of the example interrogation transceiver attached to a side region of the drill bit.
Figure 3:
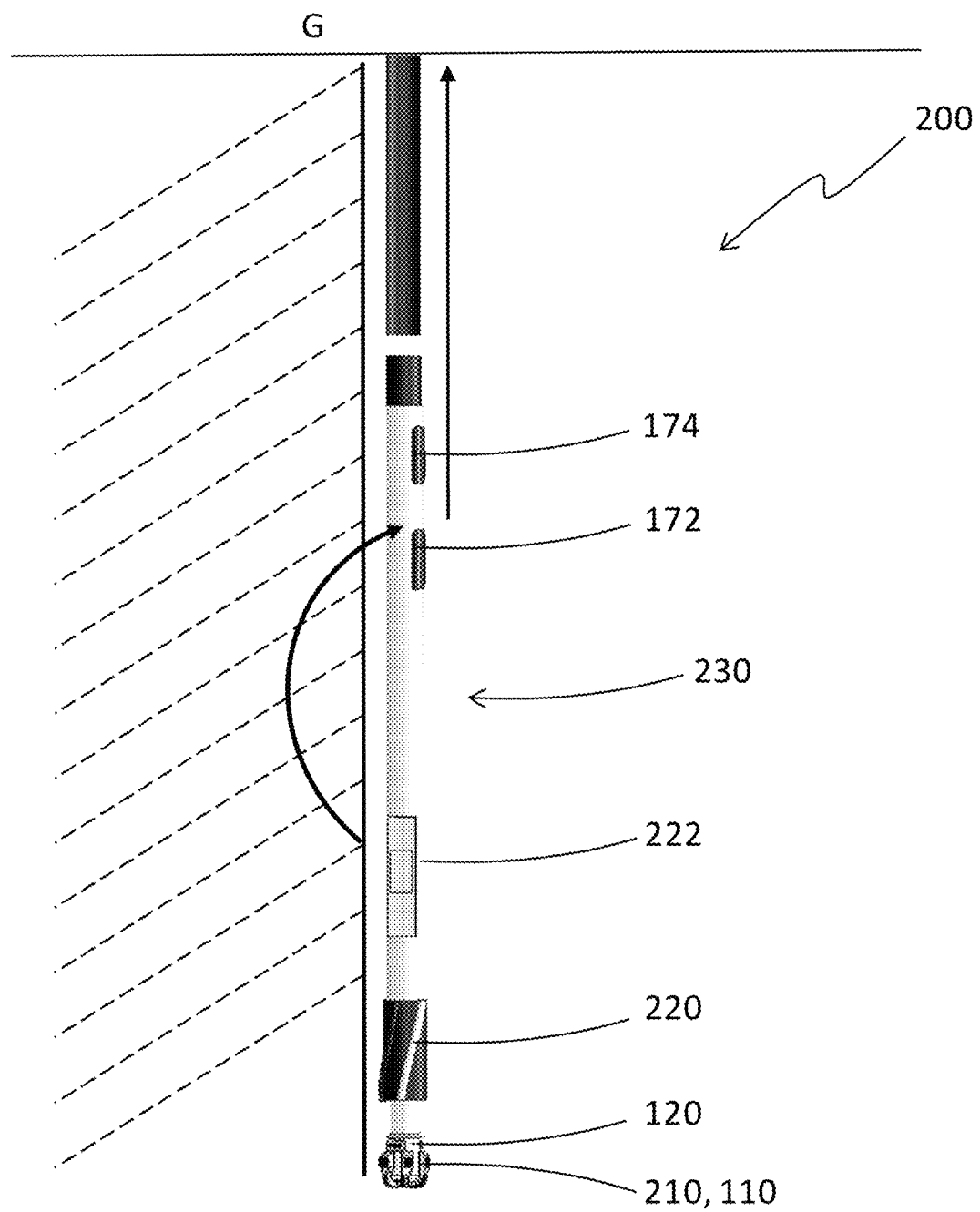
FIG. 3 shows a schematic longitudinal side view of an example drill string for oil and gas exploration, including an example drill bit down a borehole.

With particular reference to FIGS. 2A, 2B and 3, one or more cutter insert 110 may be attached to a drill bit 210 of a drilling system 200 for boring into the earth, as in oil and gas exploration. An example drill bit 210 may include a plurality of cutter inserts 110, each braze-joined into a respective pocket provided on the drill bit 210, using a brazing process that may involve heating at least a portion of the cutter element to a temperature of about 650° C. to about 700° C. The drill bit 210 may have a proximal end 206, a distal end 208 and a longitudinal rotational axis R, about which the drill bit 210 will be driven to rotate in use. The drill bit 210 may include a nose region 212 at the distal end 208 and comprise a plurality of blade structures 214, each extending radially outwards from the nose region 212 and then axially, substantially parallel to the rotational axis R towards the proximal end 206. Each blade structure 214 may have an end 215, remote from the nose region 212. The blade structures 214 may be arranged azimuthally spaced apart from each other about the rotational axis R. The drill bit 210 may include a shank portion 216 extending azimuthally about the rotational axis R and axially between the ends 215 of the blade structures 214 and the proximal end 206 of the drill bit 210.

An interrogation transceiver 120 may be attached to the shank portion 216 of the drill bit 210. Example cutter inserts 110 that form part of the sensor system 100 may be referred to as "sensor cutters", to distinguish them from cutter inserts that are not part of the sensor system 100 and do not include a signal guide medium 140. At least one sensor cutter 110 may be attached to the nose region 212, where cutting conditions such as stress and abrasion may be harshest and where the cutter inserts 110 may be likely to fail by wear or fracture before cutter inserts 110 at other positions on the drill bit 210.

The distance between a sensor cutter 110 and an interrogation transceiver 120 may be up to about 10 cm. In general, it may be desired to locate the interrogation transceiver 120 and the sensor transceiver system 130 as close together as possible, to achieve as high as possible a signal-to-noise ratio (SNR) in the detected RF response signal. In the example arrangement illustrated in FIGS. 2A and 2B, the interrogation transceiver 120 may be attached to the shank portion 216, within a housing recess 218. In some example arrangements (not shown), the interrogation transceiver 120 may be attached to the drill bit 210 in a housing recess between successive blade structures 214, or behind a "false cutter" attached to a side portion of a blade structure 212, the false cutter protecting the interrogation transceiver 120 when the drill bit 210 is in use (a false cutter is so called because it engages the side of the well being bored and is likely to experience substantially lower forces in use than other cutter inserts such as those at in the nose region 212). In another example arrangement, the interrogation transceiver 120 may be positioned behind a back-up cutter (not shown) of an example cutter insert 110. The back-up cutter may be radially more recessed than the sensor cutter 110, since its main purpose is not to cut rock. Positioning the interrogation transceiver 120 behind a back-up cutter may reduce the distance between the interrogation transceiver 120 and the sensor transceiver system 130.

In some example arrangements, the sensor system 100 may include a plurality of sensor cutters 110 operating in communication with one interrogation transceiver 120, the sensor transceiver system 130 and the interrogation transceiver 120 communicating with each other by short-hop telemetry. In some examples, a telemetry signal may have a frequency of at least about 10 Hz. The drill bit 210 may include an internal channel (not shown) for conveying drilling fluid into the bottom of the hole, and the signal processor 150 (shown in FIG. 1) may be attached within the internal channel, contained within a protective housing (not shown).

With reference to FIG. 3, an example drilling system 200 may comprise a drill string 230 extending from ground-level G to the drill bit 210 at the bottom of a well being bored, the weight of the drill string 230 being substantially applied to the drill bit 210. The drill string 230 may include a set of stabilisers 220 to stabilise the rotation of the drill string 230 within the borehole, and a rotary steerable system 222. An example sensor system 100 may include a "measurement while drilling" (MWD) system or device 172 for analysing data encoded in the signals originating from the sensor transceiver system 130 attached to at least one sensor cutter 110 on the drill bit 210. Alternatively or additionally, an example sensor system 100 may include a "logging while drilling" (LWD) system or device 174, which may record data encoded in the signal from the sensor transceiver system 130, to be downloaded and analysed once the drill bit 210 has been brought to the surface G. The MWD 172 and/or the LWD 174 may be attached to the drill string 230, forming part of the drill assembly 200. In some examples, communicating signals from the interrogation transceiver 120 to the MWD 172 or LWD 174, and/or to or another data analysis system 170 (in FIG. 1), and/or to or from a signal processor system 150 (in FIG. 1) may include encoding the signal into the flowing mud that will be driven up the well by the drilling fluid in use, by a method known as mud pulse telemetry. For example, when a drill bit is being operated, liquid may be driven through a channel along the drill string and exit the drill bit through an aperture at high speed, near the bottom of the borehole. The liquid may transport drilled rock material up to ground level G, through a gap between the drill string and the sides of the hole (that is, over the outer side of the drill string). Data may be encoded as acoustic pulses in the downward-flowing stream, in the opposite direction of the flow, since the acoustic pulse would travel through the liquid substantially faster than the flow rate.

In use, the PCD portion 112 of a sensor cutter 110 will engage rock. The PCD surface 118 may be disposed at a rake angle with respect to the rock, the cutting edge 116 breaking off chips of the rock (not shown), which will move over an area of the PCD surface 118 that may be referred to as a "rake face". The rock chips may be highly abrasive and may contain a significant amount of heat, and depending on the composition of the rock, pieces may adhere to the PCD surface 118, which may speed up the degradation of the PCD portion 112.

Figure 4:
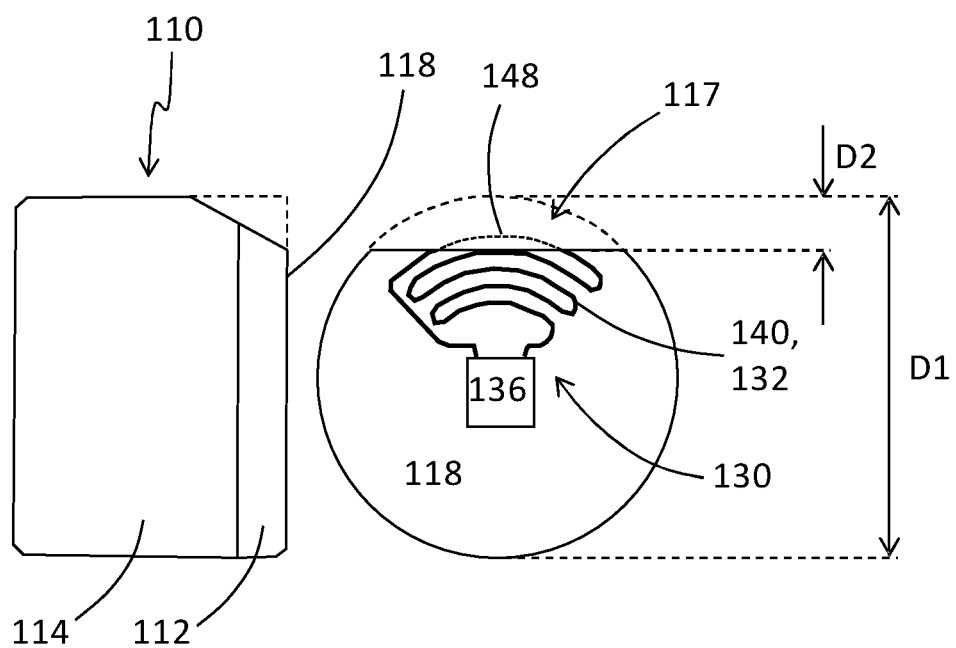
FIG. 4 shows a schematic side view (left side) and top view (right side) of the example cutter insert of FIGS. 1A and 1B after a wear region of the cutter insert has been lost due to fracture or progressive wear in use.

As illustrated schematically in FIG. 4, the PCD layer 112 may become worn or fractured in use, PCD material and potentially also substrate material being lost from a wear region 117 adjacent the original cutting edge 116 (shown in FIG. 1B). In other words, the wear region 117 is vulnerable to being worn away in use. Viewed from the PCD surface 118, the wear region 117 may extend diametrically from the original cutting edge 116 (that is, the cutting edge 116 prior to use), over an edge distance D2. The distance D2 may be up to about $\frac{3}{8}^{th}$ (that is, 0.375×) the diameter D1 before the cutter insert 110 may be deemed to have failed. A vulnerable portion 148 of the track 140 forming the sensor antenna 132 may pass through the wear region 117 and at least a part of the vulnerable portion 148 will be lost when the wear region 117 is lost in use. When the vulnerable portion 148 of the sensor antenna 132 is lost with due to wear, the track 140 forming the sensor antenna 132 will become open circuit and the sensor antenna 132 will not transmit a response signal RS, or the response signal RS will be significantly attenuated or modified in some way. The absence or substantial modification of the response signal RS will indicate that the vulnerable portion 148 of the sensor antenna 132 has been lost or degraded as a result of substantial degradation of the cutter insert 110. Failure of the cutter insert 110 may be indicated by the absence of an RF response signal, or a predetermined degree of modification of the RF response signal.

In some examples, a cutter insert 110 may have a diameter D1 of 16 mm and a failure condition of the cutter insert 110 may arise when a wear region 117 extends a radial edge distance D2 of at least about 6 mm from the cutting edge 116, over the PCD surface 118. The failure condition may arise due to progressive abrasion of the PCD portion 112 and the underlying substrate 114, and/or fracture of the PCD portion 112 in use. An example track 140 for an RF backscatter antenna 132 may include a vulnerable portion 148 that extends into the wear region 117, less than the distance D2 from the cutting edge 116. When the wear portion 117 is lost, the vulnerable portion 148 of the RF backscatter antenna 132 is also lost, disabling or degrading the RF backscatter capability of the RF antenna 132. If the PCD portion 112 within the wear region 117 is worn progressively, then the thickness of the vulnerable portion 148 of the track 140 may be progressively reduced, resulting in a progressive increase in the electrically resistance of the circuit 140, consequently modifying one or more characteristic of the backscattered RF response signal RS. For example, a change in the impedance of the track 140 may shift its resonance frequency, thus reducing the amplitude of the RF response signal RS at the frequency of the interrogation signal IS. In this example, the electrical conductivity (or impedance) of the track 140 forming the RF backscatter antenna 132 would be dependent upon the wear condition of the cutter insert 110, and a change in the associated RF response signal could indicate that the wear condition of the cutter insert 110 had progressed to a failure condition.

With reference to FIGS. 5A to 6B, the signal guide medium 140 may be attached to the PCD portion 112 by a connection portion 190. The connection portion 190 may comprise metal alloy material 190, or elemental metal such as gold (Au), and may have a mean thickness of about 500 microns. In the particular example illustrated in in these Figures, the sensor transceiver system 130 comprises a surface acoustic wave (SAW) sensor device 130 attached to the PCD surface 118 of an example sensor cutter 110.

The SAW device 130 may comprise an RF antenna 132, an interdigital transducer (IDT) 134, a piezoelectric strip 142 and a plurality of reflector strips 144, 148 (at least one of the reflector strips 148 may function as a vulnerable portion 148 of the signal guide medium 140). The signal guide medium 140 may comprise a piezoelectric strip 142 and one or more reflector strips 144, 148, and may be attached to a ceramic base (not shown). In general, the signal guide medium 140 may comprise more than one kind of guide medium, to guide more than one kind of signal. For example, a signal guide medium 140 may comprise a first medium 142 for carrying an acoustic signal and a second medium 144, 148 for coupling the acoustic signal to a transient electrical signal. In other words, the guided signal may take various forms within or on various kinds of signal guide media 140, provided that the signal guide medium 140 constrains the path or location of the guided signal.

Referring to FIGS. 5A to 6B, the piezoelectric strip 142 may consist essentially of an oblong sheet of piezoelectric material 142, having a longitudinal axis L and arranged diametrically on the PCD surface 118, the longitudinal axis L extending through the cutting edge 116. For example, the piezoelectric material 142 may consist essentially of at least one of lithium niobite ($LiNbO_3$), langasite ($La_3Ga_5SiO_{14}$), langanite ($La_3Ga_{5.5}Nb_{0.5}O_{14}$) or langatate ($La_3Ga_{5.5}Ta_{0.5}O_{14}$) and have a thickness of about 100 microns. In some examples, the IDT 134 and reflector strips 144, 148 may consist essentially of a refractory alloy, including at least one of the combinations of Pa and Pt, Ir and Rh, Ir and W, Ir and Re, IR and Mo, Ir and Ru, Ir and Hf, Ir and Pt, Ir and Pd, and Ir and Ni. The reflector strips 1444, 148 and the IDT 134 may be etched into the piezoelectric strip 142 or deposited onto the piezoelectric strip 142 by physical vapour deposition (PVD), for example. In some examples, a thin cover layer (not shown) of abrasive-resistant material may be provided as a protective cover for the SAW device 130, or other kind of signal guide medium 140. An example cover layer may comprise diamond material, which may be produced by using a chemical vapour deposition (CVD) process and have a mean thickness of about 100 microns.

The IDT 134 and the reflector strips 144, 148 may be attached to the piezoelectric strip 142 and arranged perpendicular to the longitudinal axis L, the reflector strips 144, 148 positioned at respective radial distances D3 from the IDT 134 and at respective complementary distances D4 from the cutting edge 116. In other words, the reflector strips 144, 148 may be arranged parallel to each other, radially spaced apart between the IDT 134 and the cutting edge 116. The IDT 134 may be electrically connected to the RF antenna 132, which is configured to receive the RF interrogation signal and transmit the RF response signal, the RF response signal resulting from the processing of the RF interrogation signal by the SAW device 130. The IDT 134 is electronically coupled to the piezoelectric strip 142, transducing the received RF interrogation signal into an acoustic signal carried by the piezoelectric strip 142. When the acoustic signal arrives at a reflector strip 144, 148, it is partially reflected towards the IDT 134 and partially allowed to continue propagating along the piezoelectric strip 142 to the subsequent reflector strip 144, 148. In this way, a superposition of reflected acoustic signals is received by the IDT 134 and converted into an electrical signal, which is transduced into an RF response signal. The time structure of the RF response signal is thus indicative of the arrangement of the reflector strips 144, 148 relative to the IDT 134 and to each other.

Figures 5A, 5B:
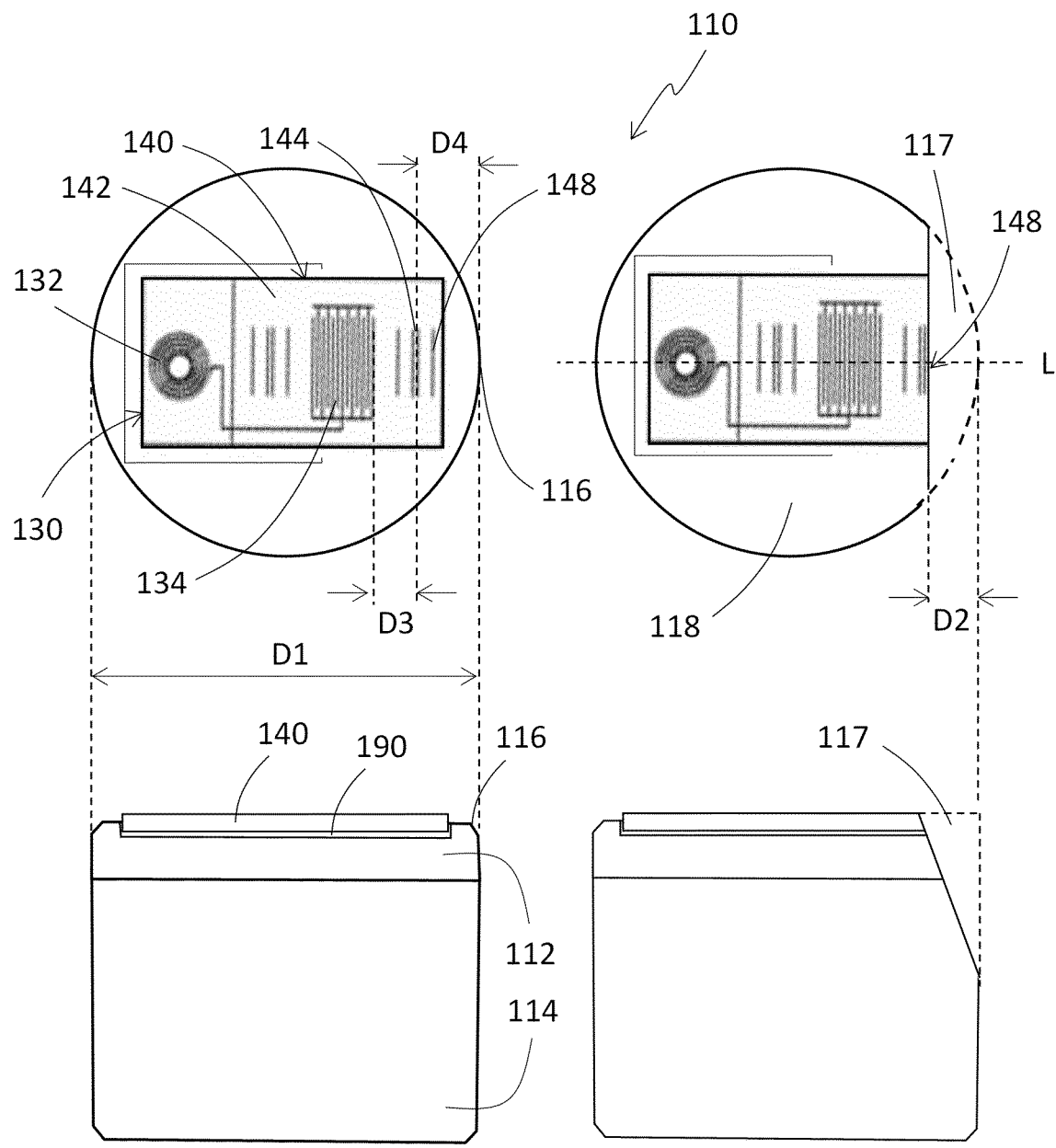
FIG. 5A shows a schematic top view (upper) and side view (lower) of an example cutter insert for an earth-boring bit prior to use, including an example surface acoustic wave (SAW) device.
FIG. 5B shows a schematic top view (upper) and side view (lower) of the example cutter insert of FIG. 5A after a wear region of the cutter insert has been lost due to fracture or progressive wear in use.
Figure 6A:
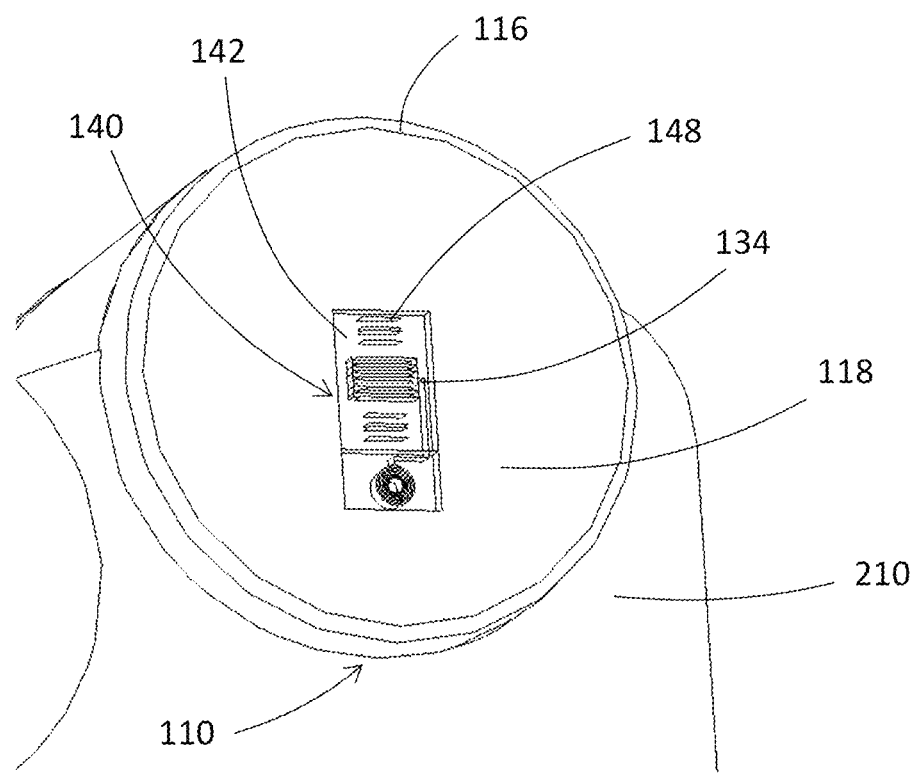
FIG. 6A shows an enlarged schematic perspective view of the example cutter insert, including a schematic perspective view of the example SAW device attached to the super-hard portion of the cutter insert.
Figure 6B:
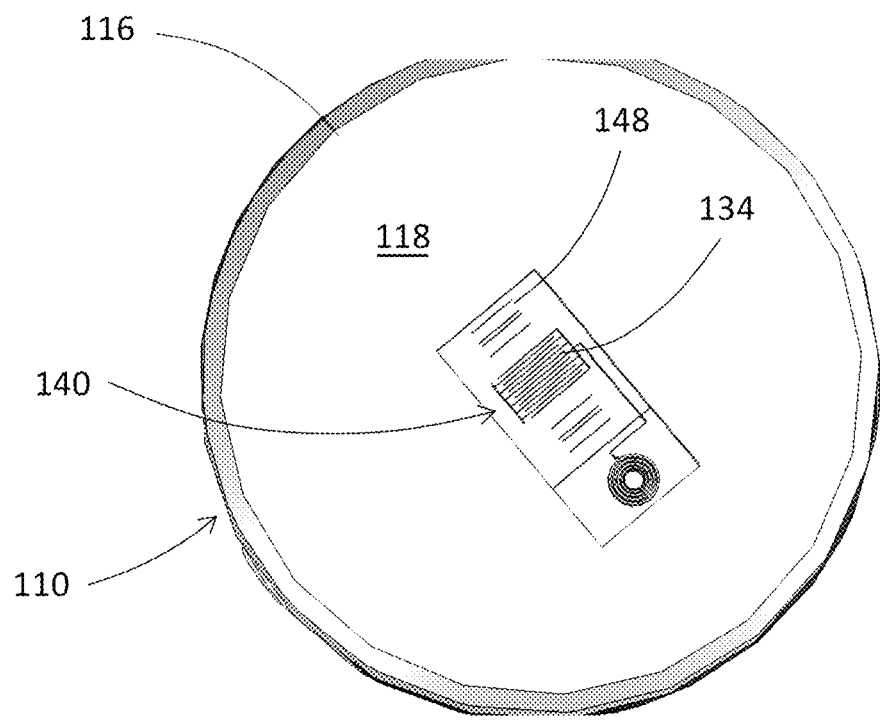
FIG. 6B shows a schematic top view of the cutter insert of FIG. 6A, including a schematic top view of the SAW device.

As illustrated in FIG. 5B, the PCD layer 112 may become worn or fractured in use, in which PCD material 112 and potentially also substrate material 114 is lost from the wear region 117 adjacent the original cutting edge 116. The wear region 117 may progress gradually and/or in incremental steps from the original cutting edge 116, along the longitudinal axis L of the piezoelectric strip 142, towards the reflector strips 144, 148. When a wear scar progresses through the wear region 117 and arrives at a vulnerable reflector strip 148 that is closest to the cutting edge 116, the vulnerable reflector strip 148 may be lost, resulting in a detectable change in one or more characteristic of the superposition of reflected acoustic signals reaching the IDT 134 and, consequently, a change in the RF response signal transmitted by the sensor antenna 132. This change may be detected in substantially real time by a data analysis system (for example, 170 in FIG. 1) and indicate that the sensor cutter 110 has failed. In some examples, more than one reflector strip 144, 148 may be removed by the progression of a wear scar through the wear region 117. A failure condition of the sensor cutter 110 may occur when the wear scar progresses all the way through the wear region 117, a predetermined distance D2 from the cutting edge 116. For example, the distance D2 may be up to about $3/8^{th}$ (that is, 0.375×) the diameter D1 of the sensor cutter 110.

Figure 7:
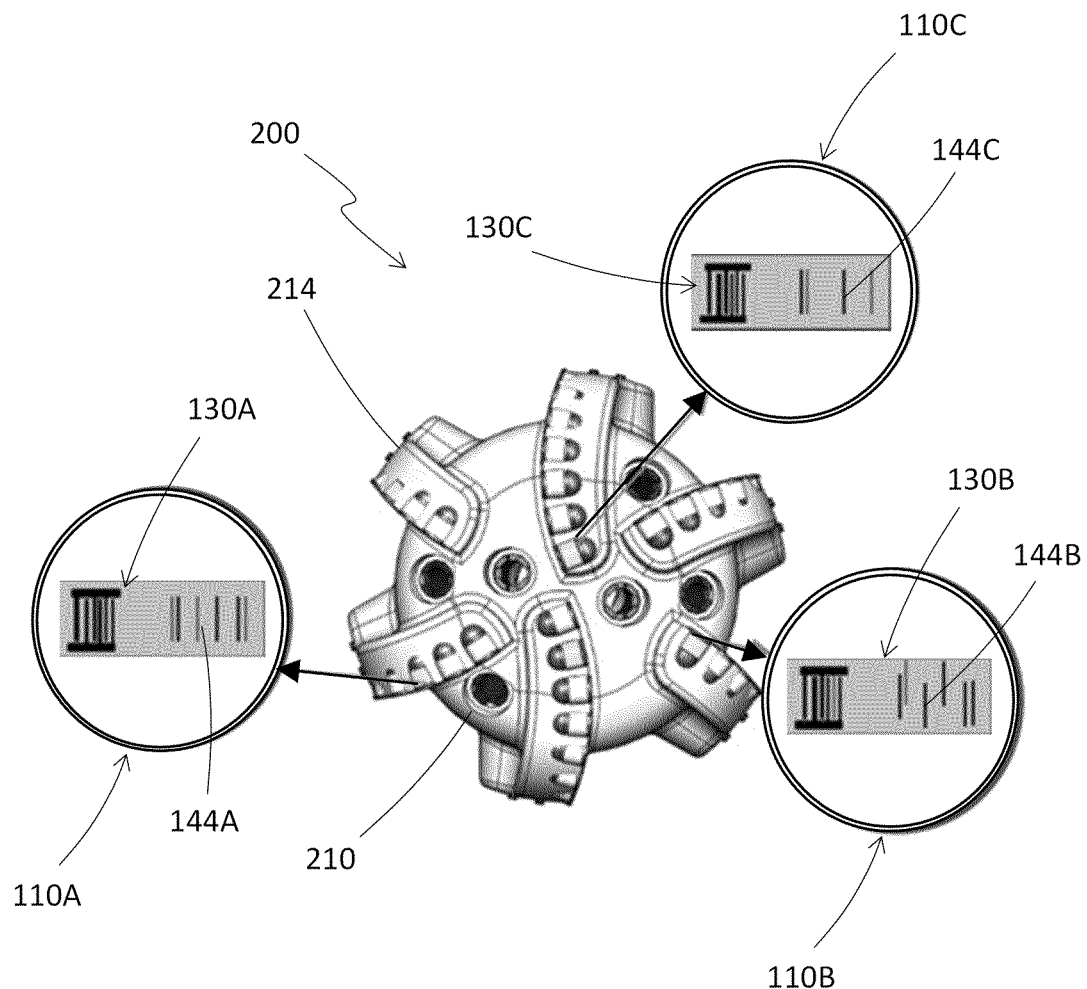
FIG. 7 shows a schematic bottom view (that is, a nose view) of an example drill bit, including enlarged top views of three schematic example cutter inserts, each comprising a respective example SAW device; each cutter insert is mounted on a different respective blade of the drill bit.

With reference to FIG. 7, an example drilling assembly 200 may comprise a drill bit 210 having six blade structures 214, three of which includes a respective sensor cutter 110A, 110B, 110C. In this particular example, each of the sensor cutters 110A, 110B, 110C may comprise a respective sensor transducer system 130A, 130B, 130C in the form of respective SAW devices 130A, 130B, 130C having different respective arrangements of reflector strips 144A, 144B, 144C. A single RF interrogation signal, broadcast from a single interrogation transceiver (not shown in this drawing) attached to the drill bit 210 may be received, transduced and guided by each signal guide media (in this example, the signal guide media comprise piezoelectric strips and reflector strips). Each of three different RF response signals transmitted by the respective SAW devices 130A, 130B, 130C may be received by the same interrogation transceiver. This may allow each of the sensor cutters 110 to be uniquely identified by a respective RF response signal, enabling an operator to monitor the condition of specific sensor cutters 110. If a sensor cutter 110 fails, its specific location on the drill bit 210 can be identified. The unique arrangements of the reflector strips 144 may thus provide unique signatures for the sensor cutters 110.

Figure 8A:
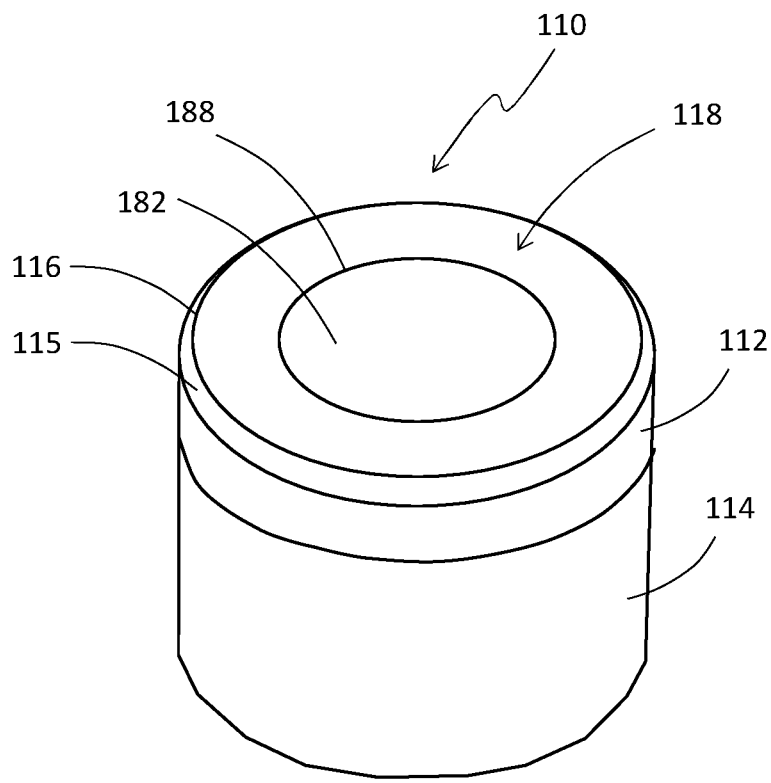
FIG. 8A shows a schematic perspective view of an example cutter insert for an oil and gas drill bit, including a sealed cavity containing sensor transceiver system (not visible)
Figure 8B:
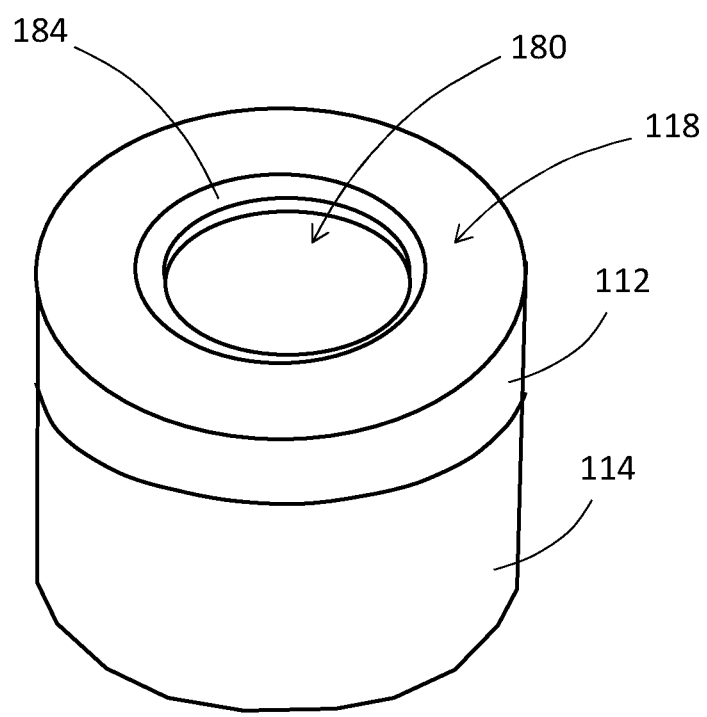
FIG. 8B shows a schematic perspective view of the cutter insert of FIG. 8A, showing the cavity for housing the sensor transceiver system, without the cover of the cavity.

With reference to FIGS. 8A and 8B, an example cutter insert 110 comprising a PCD portion 112 joined to a substrate portion 114 may include a sensor transceiver system (not shown), housed within a covered cavity 180 in the PCD layer 112. The cavity 180 may be surrounded by a chamfered peripheral region 184 for receiving a mating region (not shown) of the cover 182. In FIG. 8A, the cavity 180 is covered by a protective cover 182, which is attached to the peripheral region 184 by a join layer 188 of adhesive material (for example, the adhesive material may comprise or consist essentially of braze alloy material). The PCD portion 112 has a PCD surface 118 surrounding the protective cover 182 and extending radially from the join layer 188 to the cutting edge 116 and may include a chamfered area adjacent the cutting edge 116. In some example arrangements, the signal guide medium 140 may be housed within a cavity provided in the substrate 114, electrically insulated from the substrate and not enclosed by the substrate, since the substrate may comprise metal cementing (binder) material.

With reference to FIGS. 1 and 9A to 9G, an example cutter insert 110 comprises a PCD portion 112 joined to a cemented carbide substrate 114 at an interface boundary 113, and a sensor transceiver system 130 housed within a closed cavity 180 in the PCD portion 112. The PCD portion 112 and the substrate 114 may have a diameter D1 of 16 mm, the PCD portion 112 having a mean thickness T of about 3 mm. The PCD portion 112 includes a cylindrical cavity having a diameter D6 of about 12 mm and a depth (not indicate) of 0.8 mm, housing the circular sensor transceiver system 130 having a diameter D5 of about 11.5 mm. The cavity 180 is covered by a protective cover 182, which is joined by a join layer 188 to the PCD surface 118. The protective cover 182 may comprises diamond manufactured by chemical vapour deposition (CVD), or another abrasion resistant material manufactured by physical vapour deposition (PVD). For example, a cover 182 may comprise or consist essentially of a sufficiently abrasion-resistant and refractory dielectric material, such as aluminium nitride or silicon nitride ($Si_3N_4$), which may have the effect of reducing attenuation of the RF response signal. The PCD portion 112 has a PCD surface 118 surrounding the cavity 180 and extending radially from the join layer 188 to the cutting edge 116 and may include a chamfered area adjacent the cutting edge 116.

Figure 9A:
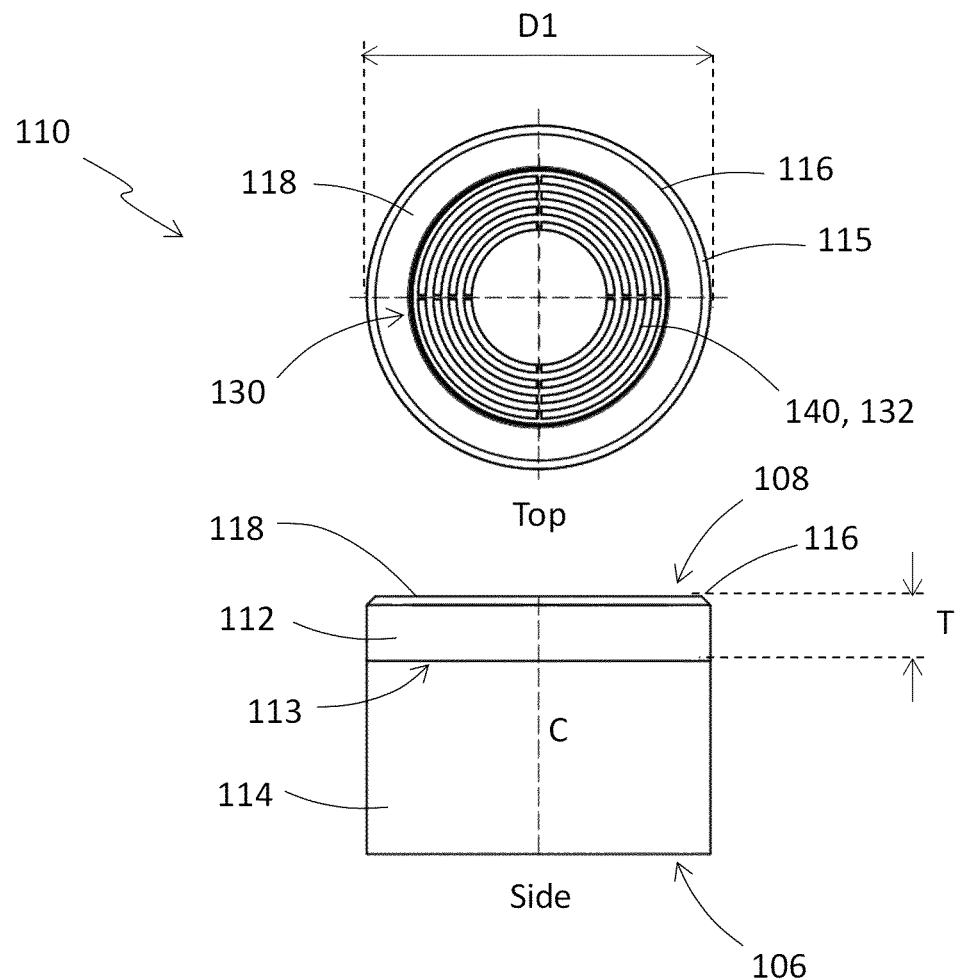
FIG. 9A shows a schematic top view (upper) and side view (lower) of an example cutter insert, including a cavity in the super-hard portion, containing an example RF backscatter transceiver.
Figure 9B:
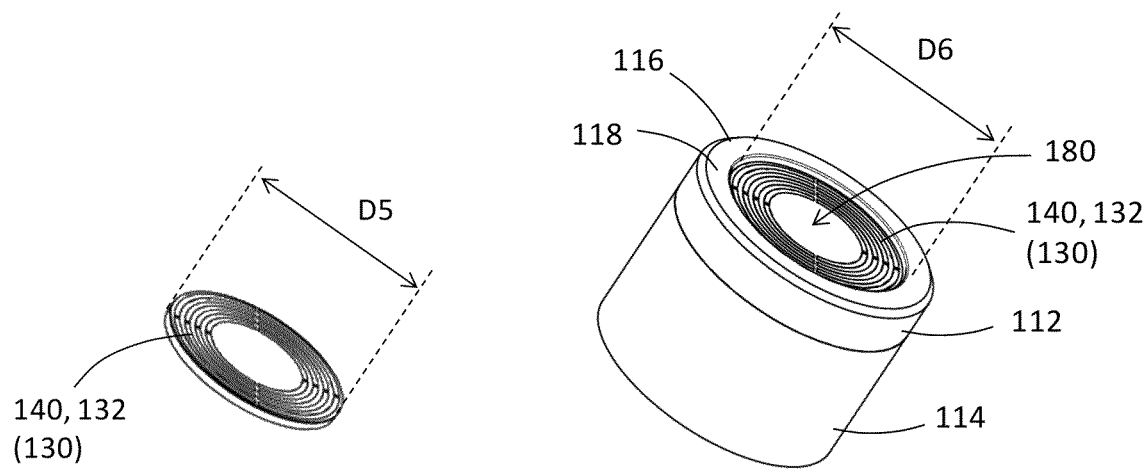
FIG. 9B shows schematic perspective views of the example RF backscatter antenna (left) apart from the cutter insert, and the example cutter insert including the RF backscatter antenna (right)
Figure 9C:
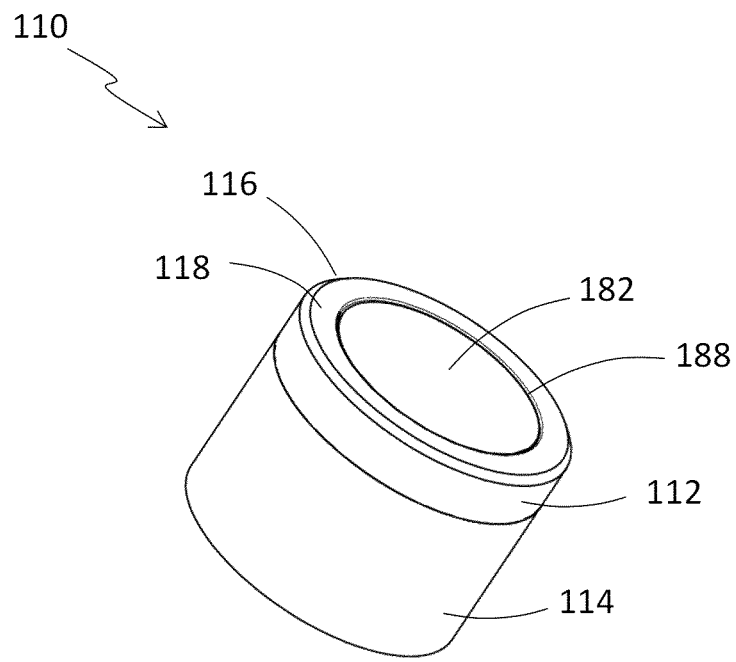
FIG. 9C shows a schematic perspective view of the example cutter insert, including a cover portion closing the cavity containing the RF backscatter transceiver.
Figure 9D:
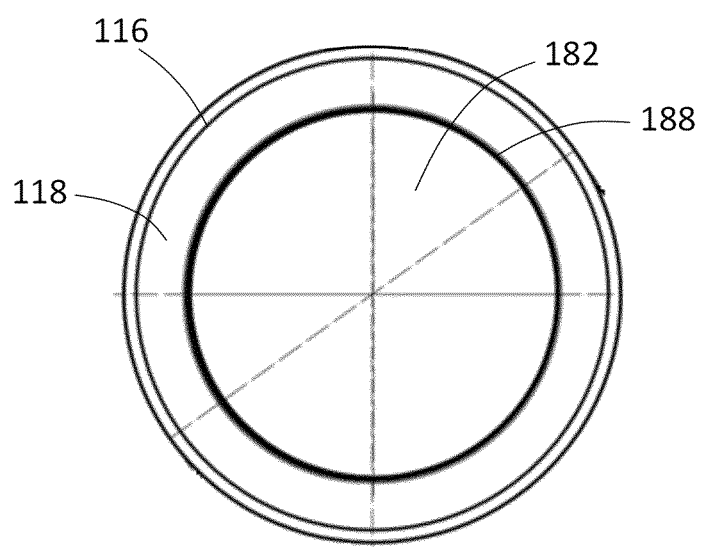
FIG. 9D shows a schematic top view of the example cutter insert illustrated in FIG. 9C.
Figure 9E:
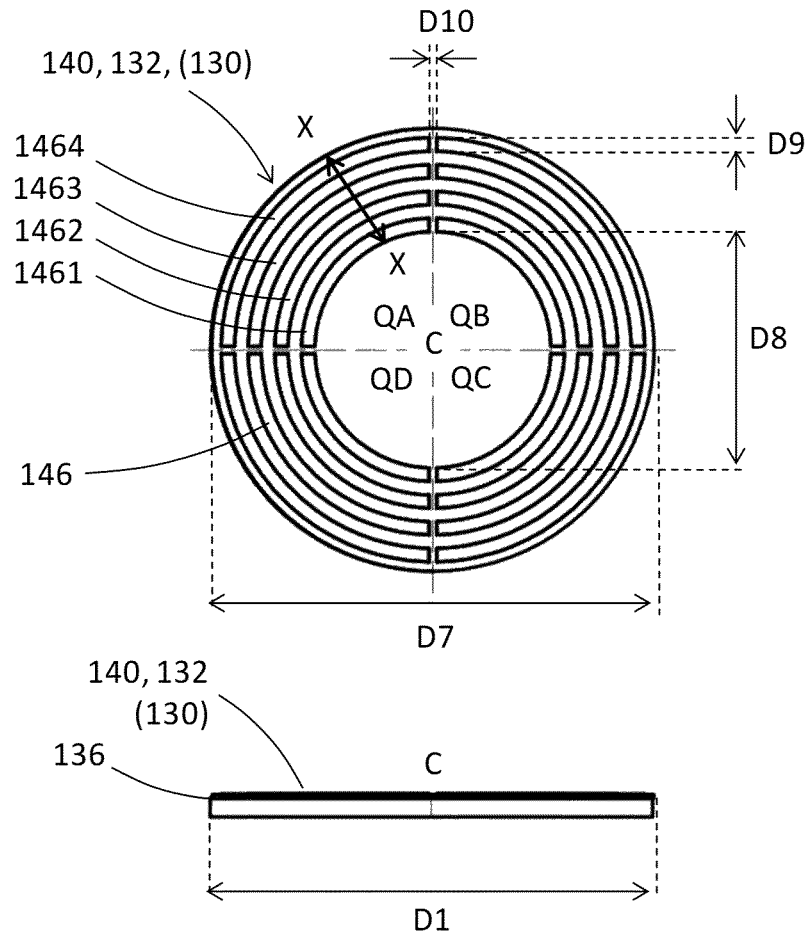
FIG. 9E shows schematic top (upper) and side (lower) views of the example RF backscatter transceiver.
Figure 9F:
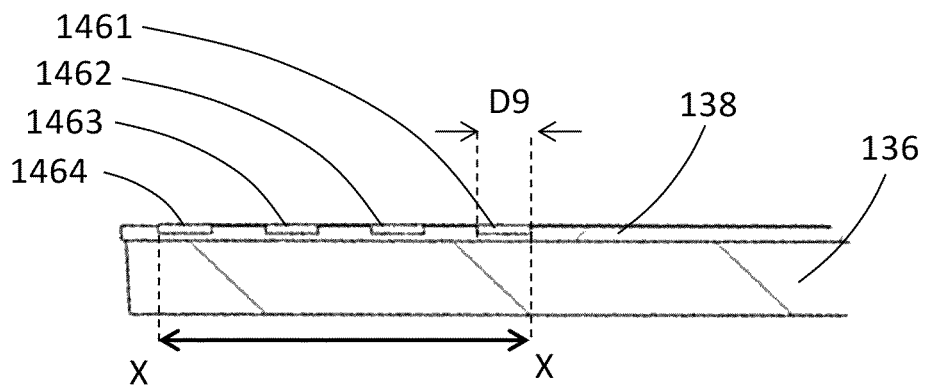
FIG. 9F shows a schematic cross-section view through the section X-X of the example RF backscatter transceiver, as indicated in FIG. 9E.
Figure 9G:
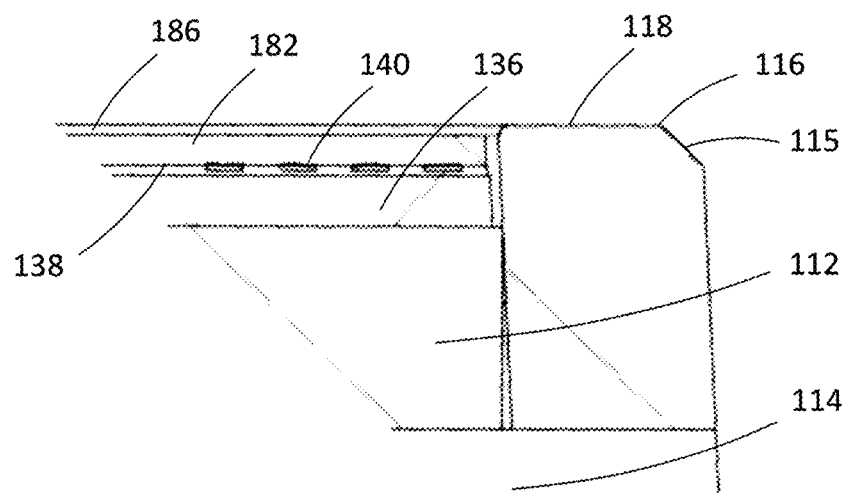
FIG. 9G shows a schematic longitudinal cross-section view of part of the example RF transceiver system, housed within a covered cavity in the super-hard portion of an example cutter element.

With particular reference to FIGS. 9E to 9G, the sensor transceiver system 130 in this example consists essentially of a chip-less sixteen-bit antenna 132, in which the signal guide medium 140 comprises sixteen independent tracks 146, forming an assembly of sixteen resonator tracks 146, each electrically independent from the others and each resonating at a quarter of the RF interrogation signal IS wavelength. In some examples, the sensor transceiver system 130 may comprise or consist of an eight-bit antenna, in which the signal guide medium 140 comprises eight independent tracks 146. The resonator tracks 146 are arranged in four groups, each group consisting of four resonator tracks 1461, 1462, 1463, 1464 within a respective one of four quadrants QA, QB, QC, QD, arranged about the central longitudinal axis C of the cutter insert 110. For example, the four resonator tracks 1461, 1462, 1463, 1464 in quadrant QA are shown in cross-section X-X in FIG. 9F. Each resonator track 1461, 1462, 1463, 1464 extends arcuately within its respective quadrant QA, each positioned at a different respective radius. In this example, the sensor transceiver system 130 consists of the sixteen resonator tracks 146 that, taken as an assembly, form the RF antenna 132 and does not include an electronic processor chip. The antenna assembly 132 of resonator tracks 146 simply resonates with and backscatters the RF interrogation signal. In some example arrangements, the tracks 140 that form the antenna 132 of the sensor transceiver system 130 may be arranged in a plurality of layers within the cavity 180 in the PCD portion 112.

With reference to FIGS. 9F and 9G, each resonator track 146 may consist essentially of gold (Au), located within a respective arcuate recess within a layer 138 of barium strontium titanate (BST) having a maximum thickness (between the resonator tracks 146) of about 10 microns. The BST layer 138 may be attached to a base plate 136 consisting essentially of alumina and having a thickness of about 0.5 mm and joined to the PCD portion 112 at the bottom of the cavity 180. In this example, the PCD surface 118 has a diameter D1 of 16 mm, measured between opposite points on the cutting edge 116. The antenna assembly 132 has an outer diameter D5 of 11.5 mm and an inner diameter D8 of 5.6 mm. Each of the resonator tracks 146 has a width D9 of 0.35 mm and proximate ends of neighbouring resonator channels are spaced apart from each other by a gap D10 of 0.2 mm.

The sensor transceiver system 130 may be manufactured by providing a circular base disc 136 consisting essentially of alumina and depositing a layer of BST material 138 onto the base disc 136. Sixteen arcuate grooves may be laser etched in the BST layer 138, each of the grooves extending arcuately within one of four quadrants, at a different respective radius within each quadrant, the grooves having a depth of about 5 microns. Gold may then be sputter-coated onto the BST layer 138 and the gold-coated BST layer 138 may be polished to remove gold between the grooves; that is, to ensure that the gold is contained only within the grooves in the BST. Each gold coating within a groove provides a respective resonator track 146 for coupling an RF electromagnetic signal to an alternating voltage within the resonator channel 146, thus providing part of a signal guide medium 140, constraining a part of the resonating electrical signal coupled to the RF interrogation signal.

An example method of attaching an RS backscatter transceiver system 130 to a cutter insert 110 is described with reference to FIGS. 10A to 10O. For example, the signal guide medium 140 comprises a plurality of tracks 140, together forming an RF backscatter antenna 132 of an RF backscatter transceiver 130. The RF backscatter transceiver system 130 may comprise the signal guide medium 140 and a base plate (not shown), which may be electrically insulating, and the signal guide medium 140 may be attached to the base plate. The cutter insert 110 has a proximal end 106 and a distal end 108, and comprises a layer of PCD material 112 joined to a cemented carbide substrate 114 at an interface boundary 113. The PCD material 112 has a PCD surface 118 at the distal end 108, including a peripheral cutting edge 116. The cutter insert 110 may be generally cylindrical, having a diameter D1 of about 16 mm. The sensor transceiver system 130 may be attached to the PCD material 112 by any of various attachment means, such as glass ceramic-based material having a high curing temperature, high temperature epoxy material or other adhesive material, braze metal alloy or other metal alloy material. A particular non-limiting example method of attachment will be described, in which one of a certain group of metal alloys is used to join an example RF backscatter transceiver 130 to acid treated PCD material 118, within a cavity 180.

FIG. 10B shows a schematic illustration of the microstructure of the PCD material 112, in which an aggregation of diamond grains 1121 are inter-grown with each other and have interstitial regions 1123 between them. This may be produced by placing an aggregation of the diamond grains 1121 onto a Co-WC substrate and sintering the diamond grains 1121 in the presence of Co or other solvent/catalyst material for diamond, at an HPHT condition. The interstitial regions 1123 may contain the solvent/catalyst material, which may comprise Co. In some example methods of processing the PCD material 112 for use as a cutting tool, the distal end 108 of the PCD material 112 may be treated with acid (not shown) to remove Co from the interstitial regions 1123 within a first PCD portion 1122 of the PCD material 112, coterminous with the PCD surface 118. This may increase the thermal stability of the treated first PCD portion 1122. The first PCD portion 120 may extend to a depth of about 100 to 500 microns from the PCD surface 118 and have a mean Co (or other metallic) content of at most about 2 weight percent (wt. %). A second PCD portion 1124 may remain untreated and extend from an interface boundary 1126 with the first PCD portion 1122 to the interface boundary 113 with the cemented carbide substrate portion 114. Because of the removal of the Co, the first PCD portion 1122 may be electrically insulating.

A cavity 180 for housing the track 140 forming the RF backscatter antenna 132 (or other signal guide medium 140 for another kind of sensor transceiver system 130) may be machined or laser-etched into the first PCD portion 1122 at the distal end 108, and then cleaned by means of SiC sand blasting and washed with isopropyl alcohol. The cavity 180 may be a generally cylindrical recess 180, having a depth of about 300 microns and a diameter D6 of 12 mm, to accommodate the RF backscatter antenna 132. The cavity 180 may include an angled peripheral region 184 coterminous with the distal end 108, for receiving a cover 182, which may have a mating peripheral region 185. Once the RF backscatter antenna 132 has been placed into the cavity 180, the mating angled peripheral regions 184, 185 may be joined by diffusion bonding, or using braze metal alloy material, or adhesive material such as certain high temperature epoxies. The depth of the cavity 180 may be substantially less than the depth of the first PCD portion 1122; that is, the bottom of the cavity 180 may be spaced apart from the interface boundary 1126 between the first and second PCD portions 1122, 1124 by a region of the first PCD portion 1122, thus providing electrical insulation between the cavity 180 and the second PCD portion 1124. In other example methods, the PCD material 112 may be acid treated to remove Co after (rather than before) the trench cavity 180 is cut or etched into the PCD material 112.

In a particular example, the RF backscatter transceiver 130 may be joined to the first PCD portion 1122 by a connection portion 190 comprising metallic join material, such as certain metal alloy materials. Metallic join material, or precursor material for forming metallic join material, may be provided in paste form and deposited in the cavity 180. For example, the metallic join material may comprise or consist essentially of metal alloy material including silver (Ag), copper (Cu), Indium (In) and titanium (Ti), such as the commercially available Incusil™ alloy having the composition 59.0% Ag, 27.25% Cu, 12.50% In and 1.25% Ti. In some examples, the alloy material may comprise an alloy including Pt and/or Pd; and in some examples, the metallic join material may include or consist essentially of gold (Au). Non-limiting example alloys for use as metallic join materials in joining various materials to PCD diamond are shown in Table 1.

TABLE 1

| Family | Liquidus temperature, (° C.) | Cu, wt. % | Pd, wt. % | Ag, wt. % | Ti, wt. % | In, wt. % | Sn, wt. % | Mn, wt. % | Al, wt. % |
|---|---|---|---|---|---|---|---|---|---|
| Cu-Ag-In | 715 | 27.3 | | 59 | 1.25 | 12.5 | | | |
| Ag-Cu | 815 | 35.3 | | 63 | 1.75 | | | | |
| Ag-Cu | 900 | 26.7 | | 69 | 4.5 | | | | |
| Ag | 912 | 5 | | 93 | 1.2 | | | | 0.8 |
| Cu-Ag | 730 | 32.5 | | 57.5 | | | 7 | 3 | |
| Ag-Cu | 790 | 22 | | 75 | | | | 3 | |
| Ag-Cu | 705 | 24 | | 61.5 | | 14.5 | | | |
| Ag-Cu | 852 | 31 | 10 | 59 | | | | | |
| Ag | | | | 98.4 | 0.6 | 1 | | | |

In various examples, the signal guide medium 140 may be provided on an electrically insulating base plate (136 in FIGS. 9F and 9G) comprising or consisting essentially of ceramics such as yttria-stabilized cubic zirconia, alumina, barium titanate, lanthanum titananate. silicon carbide, lithinum niobite. The RF backscatter transceiver 130 may be placed into the cavity 180, its base plate contacting the metallic join material to provide a pre-composite assembly (not shown). The temperature of the alloy material may then be heated to above its melting point and less than about 950° C., in a vacuum of about 1 mPa ($10^{-5}$ mbar), to melt the alloy. Some of the molten alloy material may infiltrate into a region of the first PCD portion 1122 under capillary action through the interstitial voids 1123. The Ti (or other carbide-forming metal) within the alloy material may react with carbon from the diamond grains 1121 to form TiC, chemically bonding the alloy to the diamond grains 1121. The temperature is then reduced to ambient temperature (about 20° C. to about 40° C.), well below the melting point of the alloy material, allowing the alloy material to solidify and form the connection portion 190, having an interface boundary 1126 with a non-infiltrated region of the first PCD portion 1122.

Once the RF backscatter transceiver, or other kind of sensor transceiver system 130, has been joined to the PCD material 112 at the bottom of the cavity 180, the cover 182 for the cavity 180 may be joined to the PCD material 112. The cover 182 may have the form of a disc having a mean thickness of about 100 to about 150 microns and comprise super-hard material such as CVD-deposited diamond, or other abrasive-resistant material such as $Si_3N_4$ or aluminium nitride. The cavity 180 and its cover 182 may each have a mating angled peripheral region 184, 185, respectively; for example, the angled region 184, 185 may be angled at 10° to about 80° relative to a planar surface of the cover 182. The peripheral regions 184, 185 may be joined to each other by braze material, adhesive material such as epoxy, or by a diffusion bonding process, for example. As an example, a layer of metallic alloy material (or precursor material for forming a metallic alloy) may be deposited onto the peripheral region 185 of the cover 182, and/or the peripheral region 184 of the cavity 180 by sputtering or another PVD method, for example. Pressure may be applied to the cover 182 to enhance inter-diffusion of the alloy material into the cover 182 and the PCD material 112. In some examples, the cover 180 may be attached to the PCD surface 118 by mechanical and/or adhesive means.

In other examples, the signal guide medium 140 may comprise a piezoelectric strip (142 in FIGS. 5A and 5B) and one or more reflector strips (144, 148 in FIGS. 5A and 5B) of a SAW device 130. In some examples, the adhesive material may be applied in such a way that a reflector element and the antenna of a SAW system remain in direct line-of-sight of each other, with no obstruction such as a wall or other barrier between them.

Example sensor systems may have the aspect of providing drill operators with data about the working condition of one or more cutter element(s) attached to down-hole drill bits. The cutter elements 110 which may potentially be operating at temperatures of up to about 240° C. and pressures of at least about 150 MPa. For example, the sensor system may provide information about the structural integrity of the cutter element, such as whether it has worn or fractured to the point of failure, and/or other conditions, such as the temperature or the strain of the cutter element, particularly but not exclusively the of the super-hard portion, or engaging a rock formation or other body or workpiece.

Some example sensor systems may have the aspect of having the dual function of providing information about one or more cutter element as well as performing a cutting action. In examples where a tool body comprises a plurality of cutter elements, information about the condition of the sensor cutter may provide an operator with indicative information about the likely condition of other cutter elements. Using the sensor system does not require a cutter element to be lost to the tool and replaced by a non-cutting sensor, since the sensor system itself comprises a cutter element.

Some example sensor systems may have the aspect of providing information about a condition of a cutter element directly, rather than information about a tool holder, at a position remote from the cutter element. This may be especially helpful where a tool holder is large relative to a cutter element attached to it, or the tool holder is rigid, and little or substantially no useful information about a condition of a cutter element can be inferred from a sensor measurement on the tool body.

Some example sensor systems may have the aspect of providing accurate information about a condition of a cutter element, measured directly on the cutter element, in highly abrasive or corrosive environments, without the sensor system being substantially degraded while the cutter element is in a good working condition. This may be achieved by housing the signal guide medium and/or other elements of the sensor transceiver system within a closed chamber, formed by a cavity closed by a protective cover.

The invention claimed is:
1. A sensor system comprising:
a cutter element for a cutting tool;
an interrogation transceiver operable to transmit a radio-frequency (RF) interrogation signal; and
a sensor transceiver system operable to receive the RF interrogation signal and to transmit an RF response signal;

the sensor transceiver system including a signal guide medium configured to transduce between the RF interrogation signal, a guided signal in the signal guide medium, and the RF response signal;
a characteristic of the RF response signal being dependent upon a condition of the signal guide medium; wherein
the cutter element includes the signal guide medium to allow the condition of the signal guide medium to depend upon a condition of the cutter element proximate the signal guide medium; and
the signal guide medium is operable to backscatter the RF interrogation signal as the RF response signal.

2. A sensor system as claimed in claim 1, wherein the cutter element comprises a super-hard portion defining a cutting edge; and the signal guide medium is mounted onto the super-hard portion.

3. A sensor system as claimed in claim 2, wherein the super-hard portion comprises super-hard material selected from the group comprising polycrystalline diamond material (PCD), and polycrystalline cubic boron nitride material (PCBN).

4. A sensor system as claimed in claim 1, wherein the sensor transceiver system includes
a transducer, and the signal guide medium includes an acoustic guide medium;
the transducer communicatively connected to the acoustic guide medium.

5. A sensor system as claimed in claim 1, comprising
a signal processor system communicatively connected to the interrogation transceiver to receive an indicative signal, indicative of the RF response signal, and configured to process the indicative signal and generate an output indicative of the condition of the cutter element.

6. A sensor system as claimed in claim 1, comprising
a plurality of cutter elements and a plurality of respective sensor transceiver systems, each cutter element including a respective signal guide medium;
wherein each sensor transceiver system is configured to receive the RF interrogation signal and to transmit a respective RF response signal.

7. A sensor system as claimed in claim 1, the cutter element comprising super-hard material defining a super-hard surface including a cutting edge; the super-hard surface having a diameter and including a wear region coterminous with the cutting edge, the wear region extending an edge distance diametrically from the cutting edge;
wherein at least a portion of the signal guide medium passes through the wear region; and
the edge distance is at least $3/8^{th}$ the diameter.

8. A sensor system as claimed in claim 1, wherein the signal guide medium comprises a micro-electromechanical sensor (MEMS).

9. A sensor system as claimed in claim 1, wherein the sensor transceiver system comprises a surface acoustic wave (SAW) mechanism, including:
an RF antenna, and
a transducer; and wherein
the signal guide medium comprises a piezoelectric layer and at least one reflector element attached to the piezoelectric layer operable to reflect a first acoustic signal guided by the piezoelectric layer as a second acoustic signal guided by the piezoelectric layer;
the RF antenna being connected to the transducer, and the transducer being connected to the piezoelectric layer and operable to transduce the RF interrogation signal to the first acoustic signal and to transduce the second acoustic signal to the RF response signal.

10. A sensor system as claimed in claim 1, wherein the characteristic of the signal guide medium is dependent upon the temperature or strain of the cutter element proximate the signal guide medium.

11. A cutter element for the sensor system of claim 1 wherein the cutter element includes the signal guide medium.

12. A cutter element for the sensor system of claim 1, including the sensor transceiver system.

13. A drill bit assembly for boring into the earth, comprising a drill bit, and the sensor system of claim 1, wherein the cutter element and the interrogation transceiver are attached to the drill bit.

14. A drill bit assembly as claimed in claim 13, the sensor system including a signal booster device communicatively connected to the interrogation transceiver, wherein the signal booster device is attached to the drill bit.

15. A drill bit assembly as claimed in claim 13, the sensor system including a signal processor device communicatively connected to the interrogation transceiver; wherein the signal processor device is attached to the drill bit.

16. A drill bit assembly as claimed in claim 13, the sensor system comprising a plurality of cutter elements, and a plurality of respective sensor transceivers, each cutter element including a respective signal guide medium; wherein each cutter element and the interrogation transceiver are attached to the drill bit.

17. A method of using the sensor system of claim 1, the cutter element and interrogation transceiver being attached to a drill bit for boring into the earth; the cutter element comprising a super-hard portion; the method including:
using the drill bit to bore into the earth;
the interrogation transceiver transmitting an RF interrogation signal (IS);
the sensor transceiver system transducing between the RF interrogation signal (IS), a respective guided signal in the signal guide medium, and a respective RF response signal (RS);
the interrogation transceiver receiving the RF response signal (RS);
a signal processor device processing the RF response signal (RS) and generating an indication of the condition of the cutter element.

* * * * *